United States Patent [19]
Higashida et al.

[11] Patent Number: 6,005,678
[45] Date of Patent: *Dec. 21, 1999

[54] IMAGE EDITING APPARATUS

[75] Inventors: Masaaki Higashida, Moriguchi; Masataka Higuchi, Toyono-gun, both of Japan

[73] Assignee: Matsushita Electric Industrial Co., Ltd., Osaka-fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/678,850

[22] Filed: Jul. 12, 1996

[30] Foreign Application Priority Data

Jul. 14, 1995 [JP] Japan .................................. 7-178515
Feb. 29, 1996 [JP] Japan .................................. 8-042561

[51] Int. Cl.[6] ........................... H04N 1/387; H04N 1/41; G06K 9/36; G06K 9/32
[52] U.S. Cl. ......................... 358/452; 358/453; 358/426; 358/432; 348/415; 382/258; 382/299; 382/318
[58] Field of Search .................... 358/452, 453, 358/426, 432, 433, 261.4; 348/415; 382/250, 299, 318

[56] References Cited

U.S. PATENT DOCUMENTS

| | | | |
|---|---|---|---|
| 4,513,317 | 4/1985 | Ruoff, Jr. ................. | 348/384 |
| 4,750,211 | 6/1988 | Wray ....................... | 358/524 |
| 4,751,507 | 6/1988 | Hama et al. ............... | 345/340 |
| 5,177,513 | 1/1993 | Saito ....................... | 352/129 |
| 5,204,706 | 4/1993 | Saito . | |
| 5,237,648 | 8/1993 | Mills et al. . | |
| 5,321,440 | 6/1994 | Yanagihara et al. ...... | 348/408 |
| 5,675,752 | 10/1997 | Scott et al. .............. | 345/333 |

FOREIGN PATENT DOCUMENTS

| | | |
|---|---|---|
| 0 526 064 A2 | 2/1993 | European Pat. Off. . |
| 2195482 | 8/1990 | Japan . |
| WO 92/07359 | 4/1992 | WIPO . |
| WO 94/29868 | 12/1994 | WIPO ............ H04N 5/262 |

OTHER PUBLICATIONS

Proceedings; 137th SMPTE Technical Conference and World Media Expo; Moving Images: Meeting The Challanges; Sep. 6–9, 1995 New Orleans Convention Center New Orleans, Louisiana.

Primary Examiner—Edward L. Coles
Assistant Examiner—Twyler Lamb
Attorney, Agent, or Firm—Akin, Gump, Strauss, Hauer & Feld, L.L.P.

[57] ABSTRACT

To reduce an amount of image data to transmit, and thereby achieve efficient utilization of a data transmission line, only coarse image information containing at least DC components of compressed image data stored in compressed form in a video server is transferred into a personal computer for display, and based on the displayed image, an editor performs edit work on the image of interest and produces additional information relating to the image.

7 Claims, 17 Drawing Sheets

FIG. 4

| DC | AC1 | AC5 | AC6 | AC14 | AC15 | AC27 | AC28 |
|----|-----|-----|-----|------|------|------|------|
| AC2 | AC4 | AC7 | AC13 | AC16 | AC26 | AC29 | AC42 |
| AC3 | AC8 | AC12 | AC17 | AC25 | AC30 | AC41 | AC43 |
| AC9 | AC11 | AC18 | AC24 | AC31 | AC40 | AC44 | AC53 |
| AC10 | AC19 | AC23 | AC32 | AC39 | AC45 | AC52 | AC54 |
| AC20 | AC22 | AC33 | AC38 | AC46 | AC51 | AC55 | AC60 |
| AC21 | AC34 | AC37 | AC47 | AC50 | AC56 | AC59 | AC61 |
| AC35 | AC36 | AC48 | AC49 | AC57 | AC58 | AC62 | AC63 |

HORIZONTAL FREQUENCY →

VERTICAL FREQUENCY →

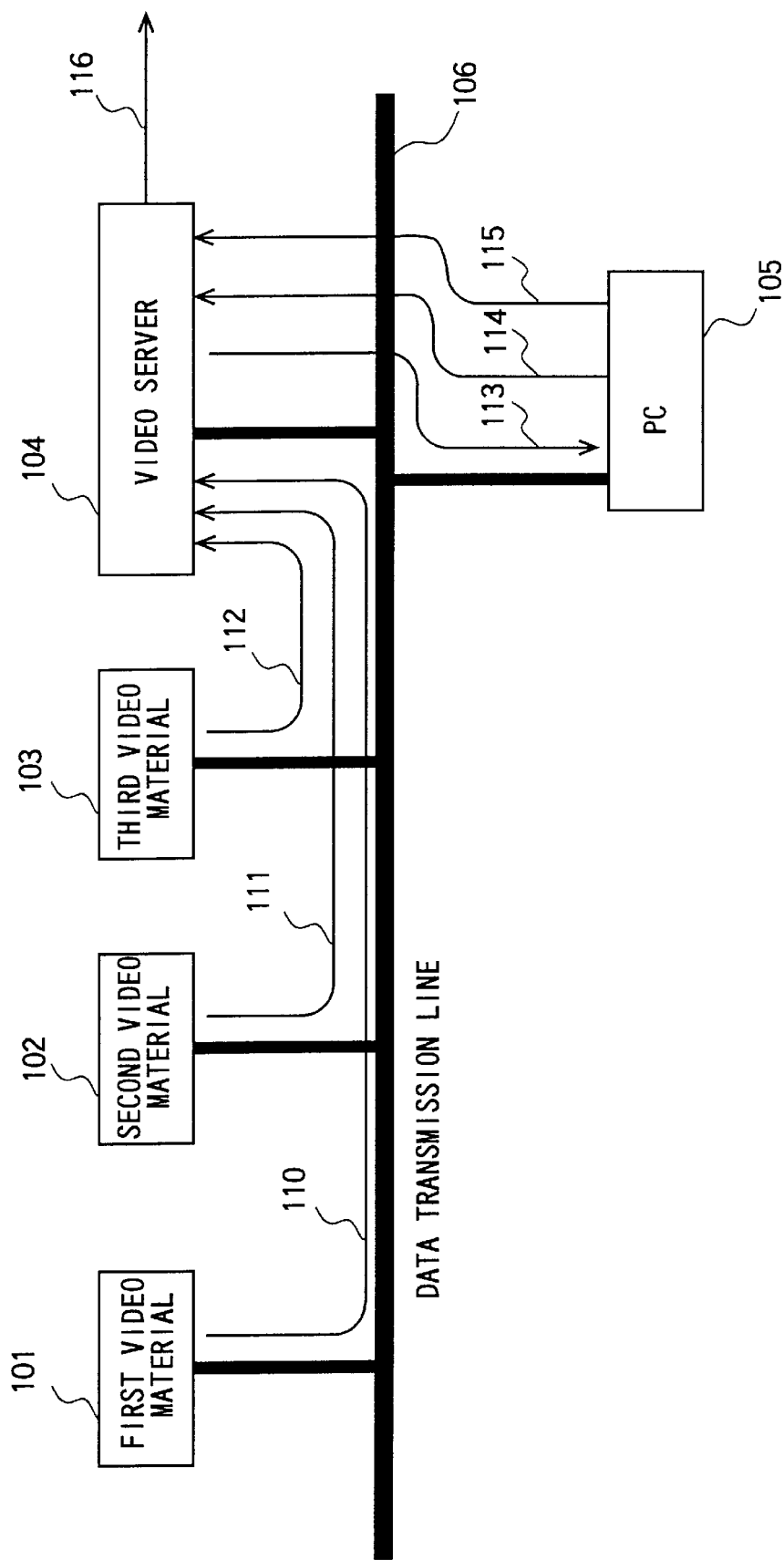
F I G. 5

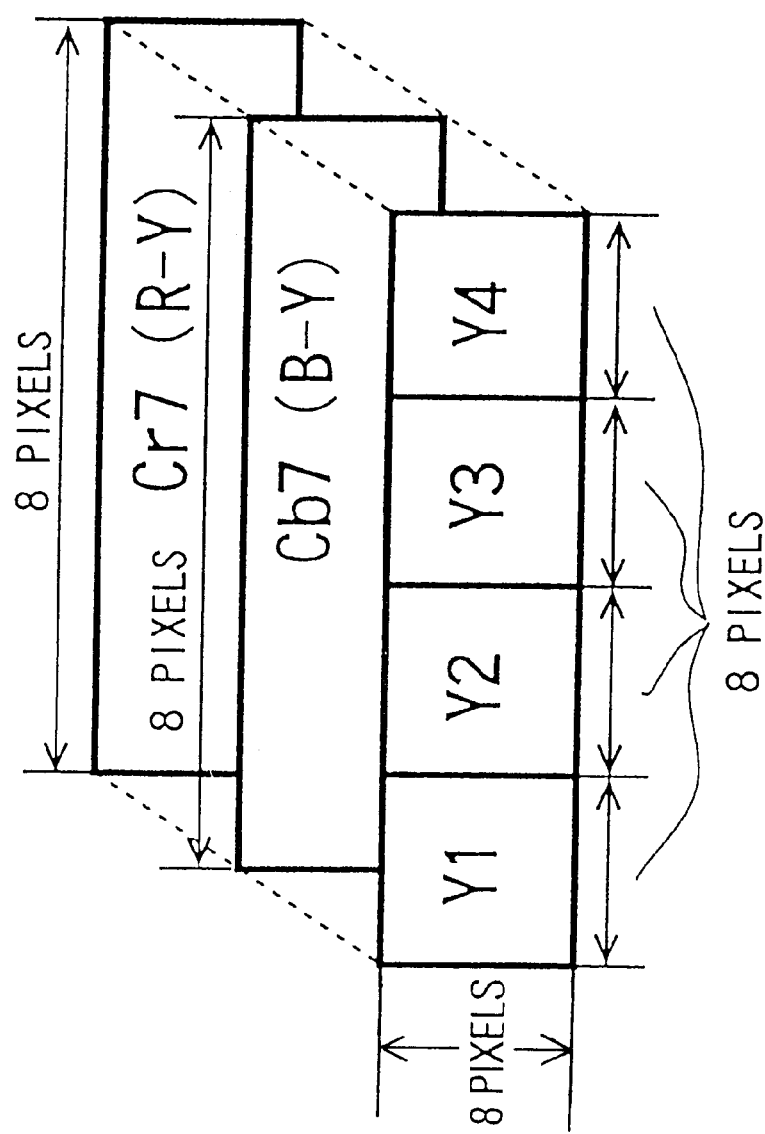
F I G. 6

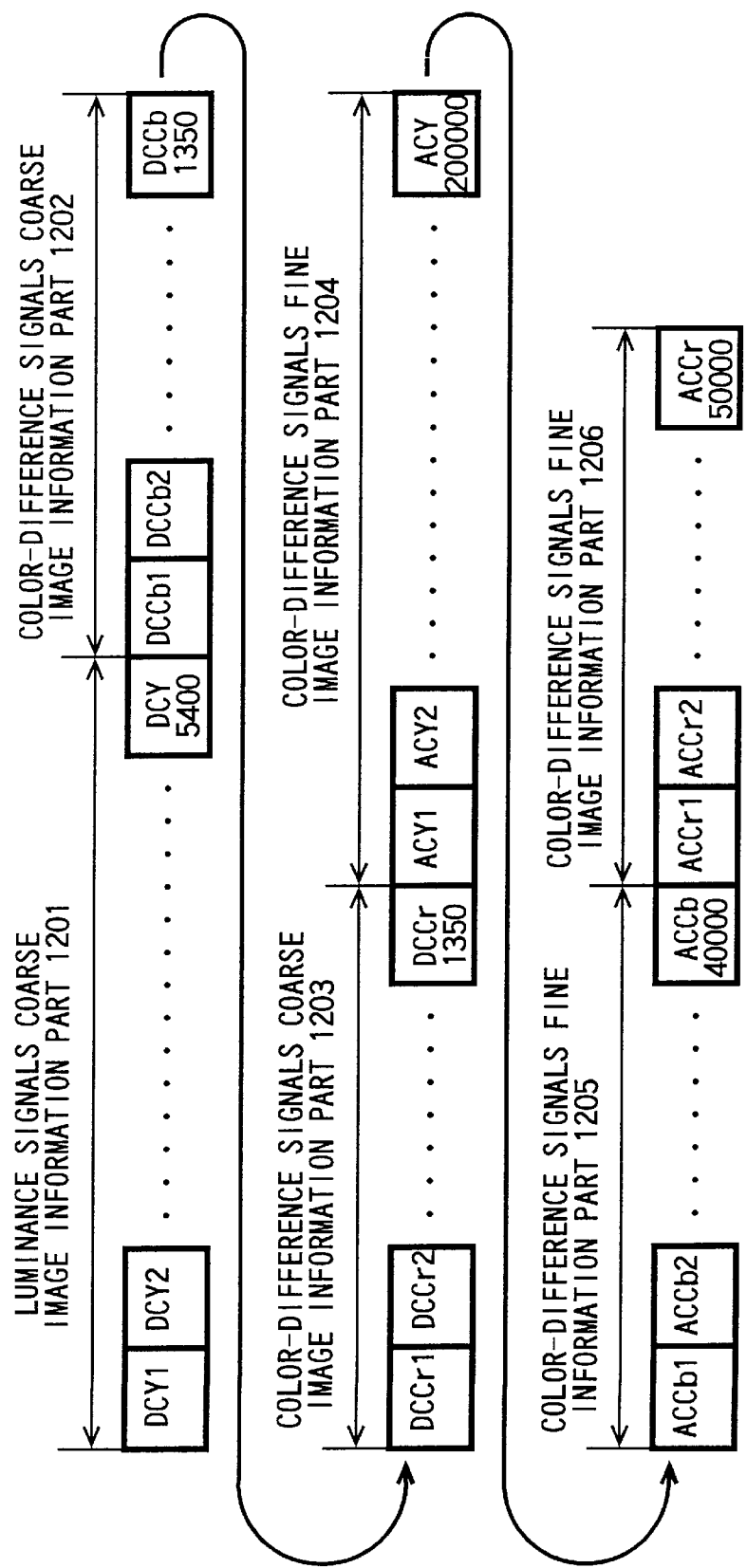
F I G. 14

IMAGE EDITING APPARATUS

FIELD OF THE INVENTION AND RELATED ART STATEMENT

1. Field of the Invention

The present invention relates to an image editing apparatus for editing digitized video signals or an image editing apparatus that allows editing work while images reproduced from video signals are being monitored, and more particularly to an image editing apparatus that is adapted for an editing system used in a television station or in postproduction.

2. Description of the Related Art

In the editing of video material taken, for example, by a television camera, nonlinear editing as described below is in general use today in broadcast stations and in postproduction. Nonlinear editing consists of first storing digitized image data in a video server or on a local disk or other image storage device attached to the video server, and then editing the image data by reordering shots and/or inserting end deleting shots within the video server.

When performing nonlinear editincg, data stored in the video server is transferred, for example, into a personal computer (hereinafter abbreviated PC) for display, and the editor chooses an edit point while viewing the displayed image. Then, by using index information transferred with the image (the index information contains data such as time code and indicates the location of that image data in the video data), an edit decision list (EDL) for on-line editing is constructed so as to carry edit data information such as edited sequence. The EDL contains information, such as edited sequence and edit points, which is used, not for tentative editing, but for the final editing of a broadcast program performed by using a video server, VTR, etc.

FIG. 17 is a block diagram showing a prior art image editing apparatus using a video server.

In FIG. 17, first video material 301, second video material 302, and third video material 303 are video materials produced or collected in a television studio or on location. The video server 304 is capable of storing (recording) large volumes of video material. PC 305 is a personal computer used, for example, by an editor or a news manuscript writer.

The first video material 301, the second video material 302, the third video material 303, the video server 304, and the PC 305 are interconnected via a data transmission line 306 over which data are transferred.

The operation of the prior art image editing apparatus shown in FIG. 17 will be described below.

The first video material 301, the second video material 302, and the third video material 303 contain video images, captured by television cameras or the like, recorded on a recording medium such as video tape. To describe by taking news program production as an example, shots selected for use in the broadcast and shots not selected are randomly contained in one video material or across more than one video material. That is, the order in which the shots are stored is random and does not correspond to the sequence of transmission (for broadcasting).

The video data from the first video material 301, the second video material 302, and the third video material 303 are transferred via the data transmission line 306 to the video server 304 for recording and storage. The video data thus stored are transmitted out upon request from the outside.

For the video server 304, a disk apparatus such as a hard disk (hereinafter abbreviated HDD) is used, allowing random access to the image data. When the first video material 301, the second video material 302, and the third video material 303 are transferred to the video server 304 for recording (storage), if the video material is already compressed, the transferred data is directly recorded in the video server 304. If the video material is noncompressed image data, high-efficiency coding is applied to compress the image data before recording.

The image data is recorded together with a video cassette number (hereinafter referred to as the cassette ID) indicating the video cassette holding the image data and information indicating the location of the image data in the video cassette (usually, the SMPTE (Society of Motion Picture and Television Engineers) time code is used). The cassette ID and the SMPTE time code constitute the index information used to locate the image.

Image data selected from among large volumes of data stored in the video server 304 is captured into the PC 305 via the data transmission line 306. While viewing the captured image on the display of the PC 305, the editor performs tentative editing by choosing shots to use, reordering shots, inserting characters into the image, or processing the image (virtual processing edit), and the EDL information is thus created.

To transfer the compressed image data, cassette ID, SMPTE time code, etc. from the video server 304 into the PC 305, data is transferred through the data transmission line 306. In the case of a large-scale editing system used at a broadcast station or the like, not only the equipment shown in FIG. 17 but many pieces of other equipment, such as digital VTRs, audLo apparatus, data storage apparatus (archive apparatus) other than the video server, and workstations, are also connected to the data transmission line 306. Furthermore, more video servers and PCs than those shown in FIG. 17 are usually connected.

The large-scale editing system of the prior art described above has had several problems. A first problem has been that, when transferring the image data from the first video material 301, the second video material 302, and the third video material 303 to the video server 304, it often happens that the data transmission capacity of the data transmission line 306 is almost used up by such data transfers, making it impossible to transfer other data. That is, the data transmission rate that the data transmission line 306 can provide has been a limiting factor in system operation.

When producing a display from compressed image data on the PC 305, even if the image data (video data) is compressed by an ordinary image compression method, the data amount is still very large. Hence, a second problem has been that, in order for the image data retrieved from the video server 304 to be displayed on the display of the PC 305, the data must reside in the main memory of the PC 305 or on an HDD attached to it. Furthermore, providing the necessary facilities in the PC 305 not only increases the equipment size and cost but also presents many problems in maintenance, environmental setting, and other operational aspects.

A third problem has been that, when the results of editing done on the PC 305 are displayed as moving images on the display of the PC 305, the moving image display speed is very slow, since the video signal contains a large amount of information even if the image data is compressed.

A fourth problem has been that, even if image data is compressed, since the video signal contains a large amount of information, the power consumption and circuit complexity are necessarily increased to handle such large information.

One possible approach to addressing the first problem is by raising the transmission capacity of the data transmission line.

For example, by using asynchronous transfer mode (ATM), 100BASE-T (100-Mbps Ethernet), 100VG-AnyLAN, fiber distributed data interface (FDDI), twisted-pair fiber distributed data interface (TPFDDI), or the like, the data transmission line can achieve a high transmission rate of 100 megabits per second or more. It is also possible to further raise the transmission capacity by providing a plurality of data transmission lines. Such approach, however, does not provide a fundamental solution. The same data transmission capacity problem as encountered with the prior art can arise again if the number of apparatus connected to the data transmission line is increased in a studio system at a television station or the like.

Another prior art example is disclosed in U.S. Pat. No. 5,204,706, Apr. 20, 1993, "MOVING PICTURE MANAGING DEVICE," by Akira Saito, which will hereinafter be referred to as the first document. A further prior art example is disclosed in U.S. Pat. No. 5,177,513, Jan. 5, 1993, "MOVING PICTURE MANAGING DEVICE AND METHOD OF MANAGING A MOVING PICTURE," by Akira Saito, which will hereinafter be referred to as the second document.

The first document and the second document both disclose an apparatus for displaying a small image on a CRT display of a PC or the like so that this content of recorded images can be viewed. This image will hereinafter be referred to as the browser. In the first and second documents, this image is called an icon.

In a specific method of displaying the browser, the first document uses a moving image in encoded form (an image in compressed form) of a frame representative of the shot of interest, and the frame is written at a representative frame write position on an HDD or the like, for browser display. That is, that frame is written twice on the HDD. On the other hand, the second document uses a frame representative of the shot of interest to produce the icon, and reduces the frame to the size of the icon. Then, using the decoded image, the icon is written to an HDD or the like to display the browser.

As described above, both the first and second documents create an image special for displaying the browser, separately from the original compressed image, and write the browser image to the HDD for use in editing work. Hence, a fifth problem that the browser image requires an extra HDD space and increases the frequency of use of the HDD.

In addition to that, both the first and second documents have the first to fourth problems described earlier.

In particular, in the case of the first document, since the browser is compressed image itself, the third problem becomes particularly pronounced.

There also arises a sixth problem with the second document in that it requires the provision of a circuit for creating the browser, further increasing circuit complexity as well as power consumption.

OBJECT AND SUMMARY OF INVENTION

The present invention is intended to overcome the above-mentioned problems of the prior art, and the object of the invention is to provide an image editing apparatus that permits simplification in construction, enable display edited images fast enough, and allows efficient operation of a studio system, including an editing system, at a television station or the like. In order to accomplish the above, when performing edit work by displaying a browser, or when transmitting an image from a video material storage apparatus to an editing apparatus such as a PC without creating an image for browsing purposes, only a minimum required amount of image data representing a rough content of a compressed image is transmitted to produce a display of quality sufficient to identify the original image, thereby reducing the amount of image data to transmit and hence achieving efficient utilization of the data transmission line.

To achieve the above object, according to the present invention, there is provided an image editing apparatus comprising: image storing means for storing image information including at least coarse image information representing a rough content of the image; and additional information creating means for an editor to create additional information relating to the image information by displaying the coarse image information.

In the present invention, there is also provided an image editing apparatus comprising: image storing means for storing image information including at least coarse image information representing a rough content of the image; and edit information creating means for an editor to perform virtual processing editing by displaying the coarse image information, and thereby create processing edit information used to perform real processing editing.

And, in the present invention, there is also provided an image editing apparatus comprising: dividing means for dividing image information between coarse image information representing a rough content of the image and fine image information representing detail information of the image; coarse image information transmitting means for transmitting the coarse image information in a plurality of contiguous segments when transmitting the coarse image information and the fine image information; and fine image information transmitting means for transmitting the fine image information in a plurality of contiguous segments.

And further, in the present invention, there is also provided an image editing apparatus comprising: dividing means for dividing image information between coarse image information representing a rough content of the image and fine image information representing detail information of said image; coarse image information transmitting means for transmitting the coarse image information in a plurality of contiguous segments; fine image information transmitting means for transmitting the fine image information in a plurality of contiguous segments; and recording means for recording the coarse image information and the fine image information.

According to the present invention, the following effects are obtained with a small system without having to provide a circuit for browser creation.

(1) The amount of data transferred between the image storing means and the edit information creating means can be drastically reduced, achieving efficient utilization of the data transmission line.

(2) Since the amount of data transferred for edit work is small, the editing apparatus can be implemented at reduced cost.

(3) The small amount of data transferred for edit work also means faster display of edited results and hence a reduction in the editing time as well as the time required to create additional information, the net result being increased efficiency of editing and additional information creation work.

(4) It is quite easy to control component devices including the CPU, and the burden on the circuits can be greatly reduced.

(5) Power consumption of component devices including the CPU can be greatly reduced.

(6) Since the coarse image information can be read very fast from a hard disk on a video server or the like, the efficiency of edit work, etc. is greatly improved.

(7) Since the amount of coarse image information read from a hard disk on a video server or the like is very small, the number of accesses is reduced and the service life of the hard disk can be extended.

(8) Since a new image need not be generated for a browser, the HDD consumption is very small.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4 is a diagram showing data after a DCT block is DCT transformed according to the imbodiment of FIG. 1, FIG. 5 is a diagram showing the system configuration of an image editing apparatus according to a preferred embodiment of the present invention, FIG. 6 is a conceptual diagram showing basic blocks for displaying a browser using DC components, FIG. 14 is a conceptual diagram illustrating the transfer of coarse image information and fine image information to the hard disk.

Figure 1:
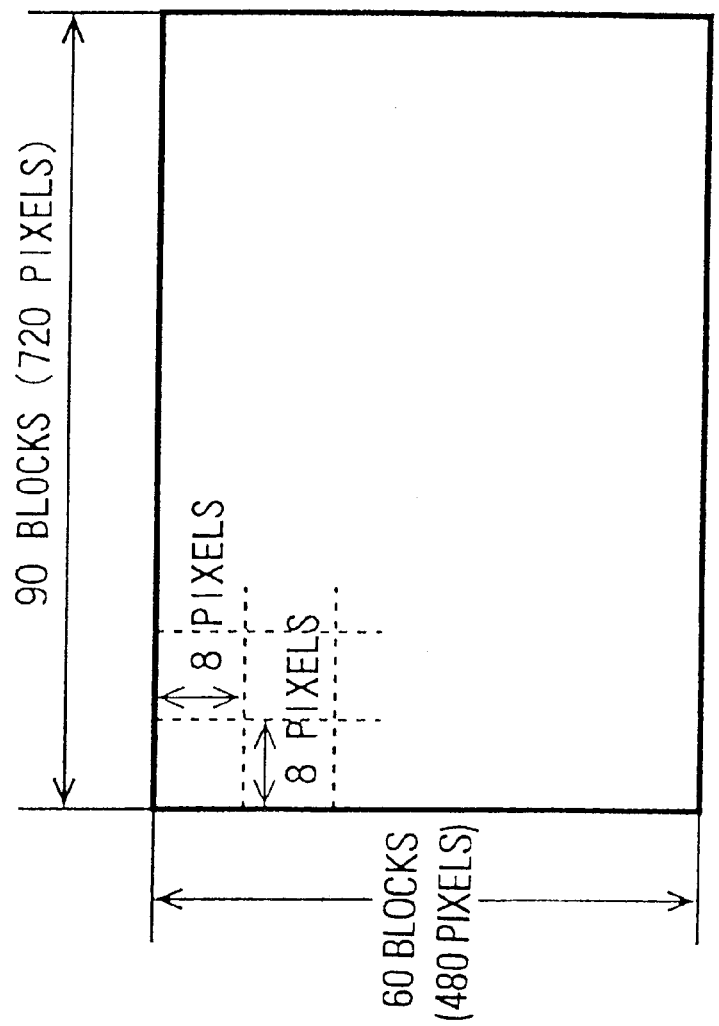
FIG. 1 is a conceptual diagram showing how luminance signal (Y signal) for one frame is divided into DCT (Discrete Cosine Transform) blocks.

It will be recognized that some or all of the Figures are schematic representations for purposes of illustration and do not necessarily depict the actual relative sizes or locations of the elements shown.

DESCRIPTION OF THE PREFERRED EMBODIMENT

A preferred embodiment of the present invention will be described in detail below with reference to the accompanying drawings.

In the description hereinafter given, the term "editing" not only means rearranging the order of image data and creating EDL information but also refers to an editing process in a broad sense, including, for example, writing a manuscript for a news program or the like while viewing images, inserting captions into images, and applying various kinds of processing to images.

Image storing means for storing image data taken by television cameras or the like (such image hereinafter called video material) include, for example, a video server. A video server is an apparatus that uses a disk apparatus such as an HDD as a storage medium and allows the use of stored video material from many terminals. Usually, when storing video material in an image storage (recording) apparatus such as a video server, image compression is applied to the video material for storage.

Image compression is described, for example, in "FUNDAMENTALS OF DIGITAL IMAGE PROCESSING," by Anil K. Jain, Prentice-Hall International Edition.

A variety of image compression schemes are known. Among others, the discrete cosine transform (DCT) is an orthogonal transform widely used for image compression when storing image data in an image storage (recording) apparatus.

In the embodiment of the invention hereinafter described, image compression based on the DCT is taken as an example of the image compression scheme.

Compression based on the DCT is adopted in various international standards, such as MPEG (Moving Picture Experts Group), JPEG (Joint Photographic Experts Group), and H.261. It is also adopted for digital VTRs, including the DVCPRO-VTR described in "DVCPRO: A Comprehensive Format Overview," Proceedings of the 137th SMPTE Technical Conference and World Media Expo MOVING IMAGES: MEETING THE CHALLENGES, The Society of Motion Picture and Television Engineers (SMPTE), Sep. 6–9, 1995, pp. 196–230. Many related books are also published.

The point of image compression based on the DCT is as follows: Pixel values (for example, brightness values) randomly distributed before the transform are arranged after the transform so that the important information is concentrated in the low-frequency components having large values, and therefore, by dropping high-frequency information by quantization, an overall reduction in information amount can be achieved.

The present embodiment will be described, based particularly on the image compression scheme employed in the above-mentioned DVCPRO-VTR standard.

In the present embodiment, video signals before image compression are component signals consisting of a luminance signal (hereinafter Y signal) and two color-difference signals R−Y (hereinafter Cr signal) and B−Y (hereinafter Cb signal) in the 525-line/60-Hz system, that is, the component signals of the 4:2:2 component signal format specified in CCIR (International Radio Consultative Committee, currently ITU-RS—International Telecommunication Union-Radiocommunication Sector) recommendation 601. The following description is given by taking the so-called 4:1:1 component signal format as an example, in which the two color-difference signals are decimated by being sampled at half the normal sampling frequency. Therefore, in this present embodiment, sampling pixel counts for one frame are 720 pixels horizontally and 480 pixels vertically for the Y signal, and 180 pixels horizontally and 480 pixels vertically for each of the Cb and Cr signals.

In the present embodiment, one DCT compression block (hereinafter simply called a DCT block) is 8×8 (8 lines ×8 pixels).

FIG. 1 is a conceptual diagram showing how the Y signal for one frame is divided into DCT blocks. Since the signal is divided into blocks of 8×8 pixels, there are 90 blocks in the horizontal direction and 60 blocks in the vertical direction, a total of 5400 blocks.

Figure 2:
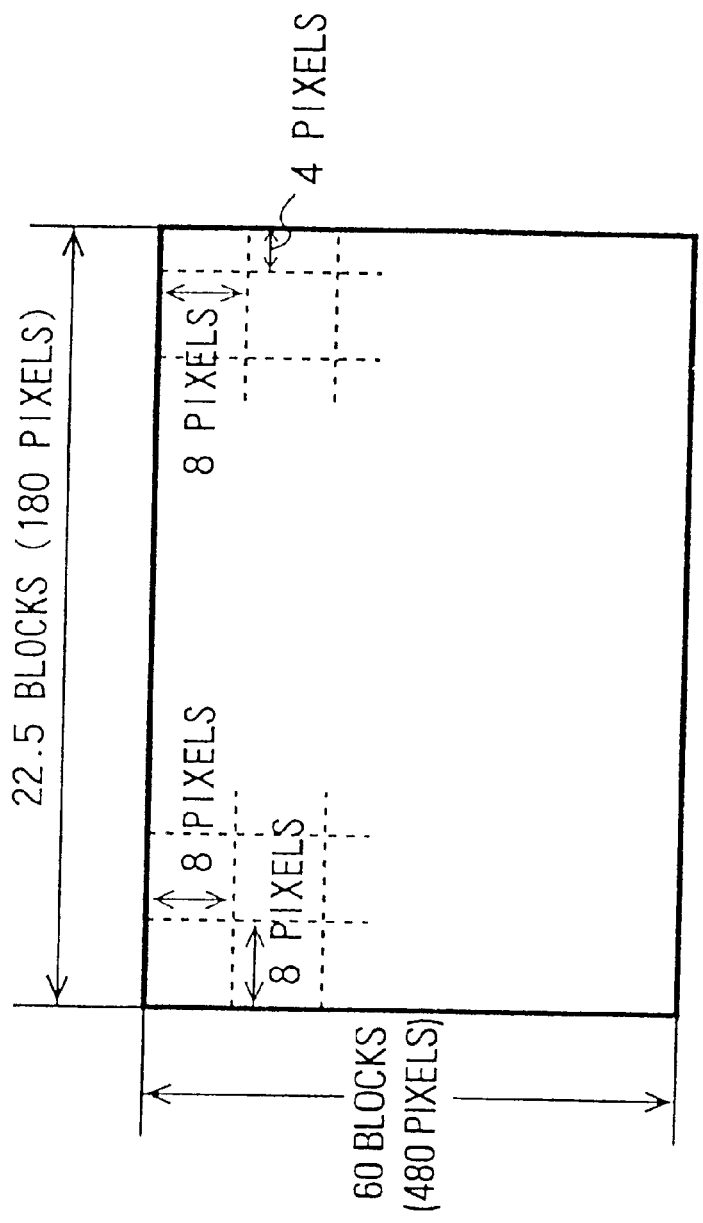
FIG. 2 is a conceptual diagram showing how color-difference signals (Cb and Cr signals) for one frame are divided into DCT blocks.

FIG. 2 is a conceptual diagram showing how the Cb and Cr signals for one frame are divided into DCT blocks. Since each signal is divided into blocks of 8×8 pixels, there are 22.5 blocks in the horizontal direction and 60 blocks in the vertical direction. When the pixels in the horizontal direction are divided by 8, four pixels are left as the remainder at the right-hand edge.

Figure 3:
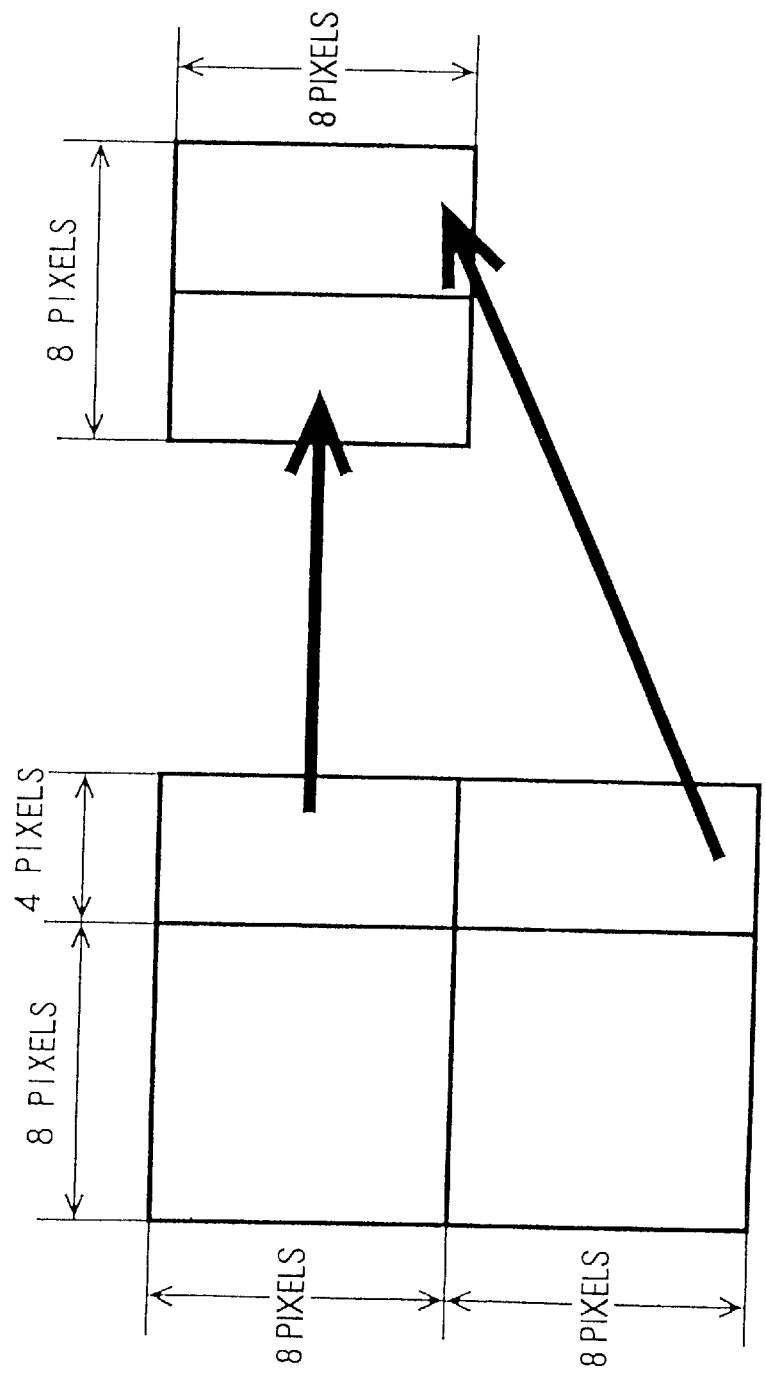
FIG. 3 is a conceptual diagram showing a method of processing the remainders left upon dividing the Cb and Cr signals into DCT blocks.

FIG. 3 is a conceptual diagram showing a method of processing the remainders left upon dividing the Cb and Cr signals into DCT blocks. As shown in FIG. 3, vertically adjacent blocks of 4×8 pixels at the right-hand edge are assembled into a block of 8×8 pixels, with the upper block arranged at the left and the lower block at the right.

Divided as shown in FIGS. 2 and 3, the Cb and Cr signals are each divided into 1350 blocks.

The DCT transform is then applied to the Y, Cb, and Cr signals divided into DCT blocks.

FIG. 4 is a conceptual diagram showing data after a DCT block is DCT transformed. In FIG. 4, DC denotes the direct-current component (hereinafter simply called the DC component) after the DCT transform, and AC1, AC2, . . . , AC63 are alternating-current components (hereinafter simply called the AC components). Since the 8×8 pixel block is DCT transformed, the DC component and the AC components together total to 64 components. As shown by the arrows in FIG. 4, the AC components are arranged from left to right in increasing horizontal frequency, and from top to bottom in increasing vertical frequency. That is, the AC components increase in frequency with increasing distance from the DC component.

In the data divided into frequency components by the DCT transform, the DC component represents the most basic and most important component of the image; as for the AC components, on the other hand, lower-frequency components contain basic image information, while high-frequency components carry information about fine detail of the image.

The important point in the essential characteristics of the present invention is that, of the DCT-transformed data, the DC component cortains the most important image information and, following the DC component, low-frequency AC components contain important information, the importance decreasing with increasing frequency. In other words, with the basic information alone the purpose of presenting a rough content of the image can be accomplished sufficiently, for example, when previewing only the content of the shot of interest for nonlinear editing, or when displaying a small image on the screen in order to choose an edit point. More specifically, for the above purpose, the DC component alone can provide sufficient information, and if AC components are used, only low-frequency components should suffice. The present invention exploits this property.

When only the DC component is used, or when the DC component and some of the AC components are used, since a portion of the original compressed image is used, there is no need to create new data for a browser, and the total amount of data does not increase. After the DCT transform, the AC components are quantized for coding, by zig-zag scanning them in increasing frequency in the order of AC1, AC2, . . . , AC63. After the pixels are DCT-transformed into coefficients, the DC component contains the largest amount of image information and, following the DC component, the amount of information gradually decreases as the frequencies of the AC components increase. Quantization is followed by variable-length coding, for example, two-dimensional Huffman coding.

After the quantization and variable-length coding, in many cases high-frequency AC conponents become zero; for example, a certain block may consist of the DC component and AC components up to AC40. Up to where the high-frequency components exist depends on the image of the block concerned.

The above-mentioned method of compressing image data for recording, by applying the DCT transform, zig-zag scanning, quantization, and variable-length coding, is well known to those skilled in the art, and is widely used in image recording apparatus such as digital VTRs and video servers.

According to the present invention, information about fine detail of the image is not necessarily required, for example, when displaying a video material image (hereinafter referred to as the browser) on a monitor screen of a PC, to choose an edit point in the video material or rearrange the order of shots and preview the results of tentative editing, or when writing news manuscripts as information to be added to image data, or when creating EDL information for final edit work. In such cases, if the image is displayed with a quality only sufficient to choose an edit point or check the results of trial editing, or to identify particular video material from among many pieces of video material and the location of the image in the video material, the intended purpose can be accomplished sufficiently even if the image resolution is low. The present invention utilizes this characteristic, and achieves reductions in the amount of data transmitted on the data transmission line and in the amount of image data transferred into the PC, by displaying the browser as coarse image information using only the DC component after the DCT transform or the DC component and some of the AC components.

In the embodiment of the present invention, of the DC and AC components of image data compressed through the DCT transform, only the DC component is used to generate the coarse image information.

Further, a video server is used as image storing means for storing image information.

A personal computer is used as an apparatus that serves as both image display means and edit information creating means.

An EDL is used as processing edit information used in actual processing edit work.

A video cassette number (cassette ID), indicating the video cassette holding the image data, and the SMPTE time code are used as index information.

FIG. 5 is a diagram showing the system configuration of the image editing apparatus according to the present embodiment.

In FIG. 5, first video material 101, second video material 102, third video material 103, a video server 104, and a personal computer (PC) 105 are interconnected via a data transmission line 106 over which data are transferred. As the data transmission line 106, any transmission line can be used as long as it can carry digital data, such as those used in ATM, B-ISDN (Broadband-Integrated Services Digital Network), 100BASE-T, 100VG-AnyLAN, FDDI, TPFDDI, Ethernet (IEEE802.2, IEEE802.3), etc. In the present embodiment, a data transmission line conforming to Ethernet (IEEE802.2, IEEE802.3) is used. In FIG. 5, a plurality of arrows, 110, 111, 112, 113, 114, 115, and 116, are shown to explain signal flow.

Arrow 110 indicates data flow from the first video material 101 to the video server 104. Arrow 111 indicates data flow from the second video material 102 to the video server 104. Arrow 112 indicates data flow from the third video material 103 to the video server 104. Arrow 113 indicates data flow from the video server 104 to the PC 105. Arrow 114 indicates command flow from the PC 105 to the video server 104. Arrow 115 indicates data flow from the PC 105 to the video server 104. Arrow 116 indicates image data output from the video server 104.

Hereinafter, the flow indicated by the arrows 110, 111, 112, 113, 114, 115, and 116 will be called signal flow.

Next, the operation of the present embodiment will be described in detail with reference to FIG. 5.

The first video material 101, the second video material 102, and the third video material 103 are video material taken or collected in a television studio or in an outdoor location, for example, for the production of a news program. Each video material is recorded, for example, on a video cassette or the like, and is played back on a VTR. In some case, the video material can be video data stored (recorded) in advance on a storage device such as an HDD. The video server 104 is an apparatus capable of storing (recording) large volumes of video material. For the video server, a disk apparatus such as an HDD apparatus is used. In the present embodiment, the first video material 101, the second video material 102, and the third video material 103 are each video material captured by a television camera, and recorded on a video cassette tape in a compressed form. For image compression, the DCT method is used.

The first video material 101 is played back on a VTR, and transferred via the data transmission line 106 for storage (recording) on the video server 104. This signal flow is indicated by the arrow 110. Likewise, the second video material 102 is played back cn a VTR, and transferred via the data transmission line 106 for storage (recording) on the video server 104. This signal flow is indicated by the arrow 111. Likewise, the third video material 103 is played back on a VTR, and transferred via the data transmission line 106 for storage (recording) on the video server 104. This signal flow is indicated by the arrow 112.

In the present embodiment, three video material sources are shown, but in an actual implementation in an editing system, video material from many sources is stored (recorded) in the video server 104.

In the present embodiment, we consider the situation where editing is performed using the first video material 101, second video material 102, and third video material 103 recorded on three different video cassettes. It is also assumed that the first video material 101, the second video material 102, and the third video material 103 each contain 30 minutes of video data recorded in the NTSC (National Television System Committee) format. The SMPTE time code (hereinafter simply called the time code) is recorded together with image data in each video material, and ZZ frame at WW hours, XX minutes, YY seconds is expressed as WW:XX:YY:ZZ. Time code, starting at 00:00:00 and ending at 00:29:59:29, is recorded in each video material.

First, the first video material 101 transfers data to the video server 104, as shown by the signal flow 110. Likewise, the second video material 102 transfers data to the video server 104, as shown by the signal flow 111. Likewise, the third video material 103 transfers data to the video server 104, as shown by the signal flow 112. These data transfers may occur simultaneously or at different times. The image data from the first video material 101, the second video material 102, and the third video material 103 are thus stored (recorded) in the video server 104. Data from each video material to the video server 104 may be transferred in real time, or like an ordinary data transfer, may be transferred over a longer time for recording, not in real time.

Next, in order to choose edit points by displaying the video material on the display of the PC 105, a person in charge of edit work (hereinafter called the editor) issues a command from the PC 105 to the video server 104, as shown by the signal flow 114, requesting transfer of image data of the first video material 101, second video material 102, and third video material 103 to the PC 105.

There are various cases where the editor requests data transfer from the video server 104 to the PC 105. In some cases, the editor may request full 30-minute data from each of the first video material 101, second video material 102, and third video material 103, or in others, he may request part of the data, for example, 10 minutes of data, or may request, not all fields of image data, but only one frame retrieved, for example, from one second of data (for example, one frame out of every 30 frames in the case of the NTSC system).

Next, as shown by the signal flow 113, the video server 104 transfers via the data transmission line 106 the image data requested through the signal flow 114 and information appertaining to the image data to the PC 105. More specifically, the video server 104 transfers the image data of the first video material 101, second video material 102, and/or third video material 103, together with the video material number (hereinafter called the ID number) and the time code.

In the present embodiment, the ID numbers are assigned as follows: ID=1 for the first video material 101, ID=2 for the second video material 102, and ID=3 for the third video material 103.

The image data transferred into the PC 105 is displayed on the display (the displayed image is hereinafter called the browser), and while viewing the displayed image, the editor performs editing such as rearranging the order of shots (hereinafter such editing is called tentative editing). The result of the tentative editing is displayed on the display of the PC 105 for confirmation. Confirmation of the edited result is done by using the browser.

Suppose that, for example, it is decided to join together image data of 1.5-minute duration, identified by time code 00:10:00:00 to 00:11:29:29, from the first video material 101 (ID=1), image data of 30-second duration, identified by time code 00:20:00:00 to 00:20:29:29, from the second video material 102 (ID=2), and image data of 2-minute duration, identified by time codes 00:15:00:00 to 00:16:59:29, from the third video material 103 (ID=2).

The editor joins the results of the above tentative edits on screen and checks the edited result on the display of the PC 105. Then, information on edit points is transferred, with ID number and time code arranged in the order of edits, from the PC 105 to the video server 104 as shown by the signal flow 115. This edit information is called the edit decision list (EDL).

The video server 104 receives the EDL from the PC 105, and outputs the image data, as shown by the signal flow 116, in the order listed in the EDL information.

The primary purpose of the present invention is to reduce the amount of data transferred on the signal flow 113 and thereby achieve efficient utilization of the data transmission line 106.

The browser used to view video material on the monitor screen of the PC 105 does not necessarily require information about fine detail of the image when doing image editing work such as choosing edit points in the video material or writing a news manuscript by viewing the image. Rather, if the image is displayed with a quality only sufficient to choose an edit point (sufficient to identify a video material source from a plurality of video material sources and a location in the video material), or only sufficient to check the edited result, the purpose of image editing can be accomplished sufficiently even if the image resolution is low. The present invention utilizes this characteristic, and achieves a drastic reduction in the amount of data transferred on the signal flow 113.

The method of reducing the amount of data transferred on the signal flow 113 will be described below.

In this embodiment of the present invention, image data stored (recorded) in the video server 104 are already compressed through the DCT process. Usually, after the DCT transform, the DC component contains the largest signal energy. As for the AC components, the lower the frequency, the larger the energy, and the higher the frequency, the smaller the energy.

Referring to FIG. 4, DC is the most important of all data, and next important are the components located close to DC, such as AC1, AC2, AC3, etc., the importance decreasing with increasing distance from DC.

Accordingly, in this embodiment of the present invention, the image for the browser is displayed using only the DC component since the image need only be displayed with a quality only sufficient to choose an edit point or sufficient to check the edited result.

The method of displaying the browser using the DC component only will be described next.

FIG. 6 is a conceptual diagram showing basic blocks for displaying the browser using DC components.

The basic blocks used to display the browser consist of a total of six DCT blocks from the Y, Cb, and Cr signals, that is, horizontally adjacent four DCT blocks Y1, Y2, Y3, and Y4 of the Y signal and DCT blocks Cb7 and Cr7 of the Cb and Cr signals, respectively.

Y1, Y2, Y3, and Y4 are the DC components of horizontally adjacent four DCT blocks of the Y signal. Cb7 and Cr7 are the DC components of the Cb and Cr signals from the same sampling point. Since the Y signal has four times as many samples as the Cb or Cr signal in the horizontal direction, in FIG. 6 the DC components of the four blocks, Y1 to Y4, and the respective blocks of the Cb and Cr signals correspond to the same point on the image (browser). Hereinafter, the DCT blocks shown in FIG. 6 are together called a DC block.

The browser is displayed by arranging DC blocks end to end on a screen.

Figure 7:
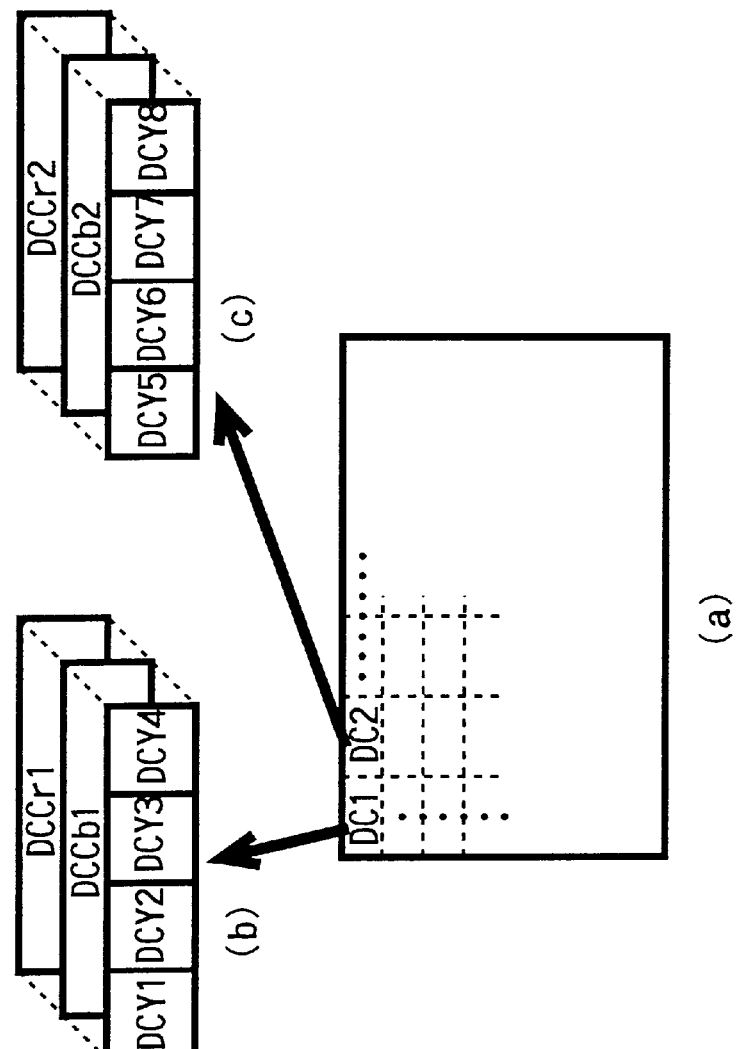
FIG. 7 is a conceptual diagram showing how the browser is displayed.

FIG. 7 is a conceptual diagram showing how the browser is displayed. In FIG. 7, part (a) is the browser. The browser consists of a plurality of DC blocks, DC1, DC2, . . . , as shown in part (a) of FIG. 7. DC1, DC2, . . . are each the DC block explained with reference to FIG. 6. DC1 consists of four DC components of the Y signal, DCY1, DCY2, DCY3, and DCY4, and DC components of the two color-difference signals, DCCb1 (DC component of the Cb signal) and DCCr1 (DC component of the Cr signal), as shown in part (b) of FIG. 7. Likewise, DC2 consists of four DC components of the Y signal, DCY5, DCY6, DCY7, and DCY8, and DC components of the two color-difference signals, DCCb2 (DC component of the Cb signal) and DCCr2 (DC component of the Cr signal), as shown in part (c) of FIG. 7. As mentioned above, the browser is constructed by arranging such DC blocks end to end on the screen.

Regarding the 8×4 pixel blocks of the Cb and Cr signals at the right-hand edge of the screen shown in FIG. 2, two DCT blocks from the Y signal and DCT blocks, one each from each of the Cb and Cr signals, are combined together to construct a DC block.

Next, an example of the use of the browser shown in FIG. 7 will be described.

Figure 8:
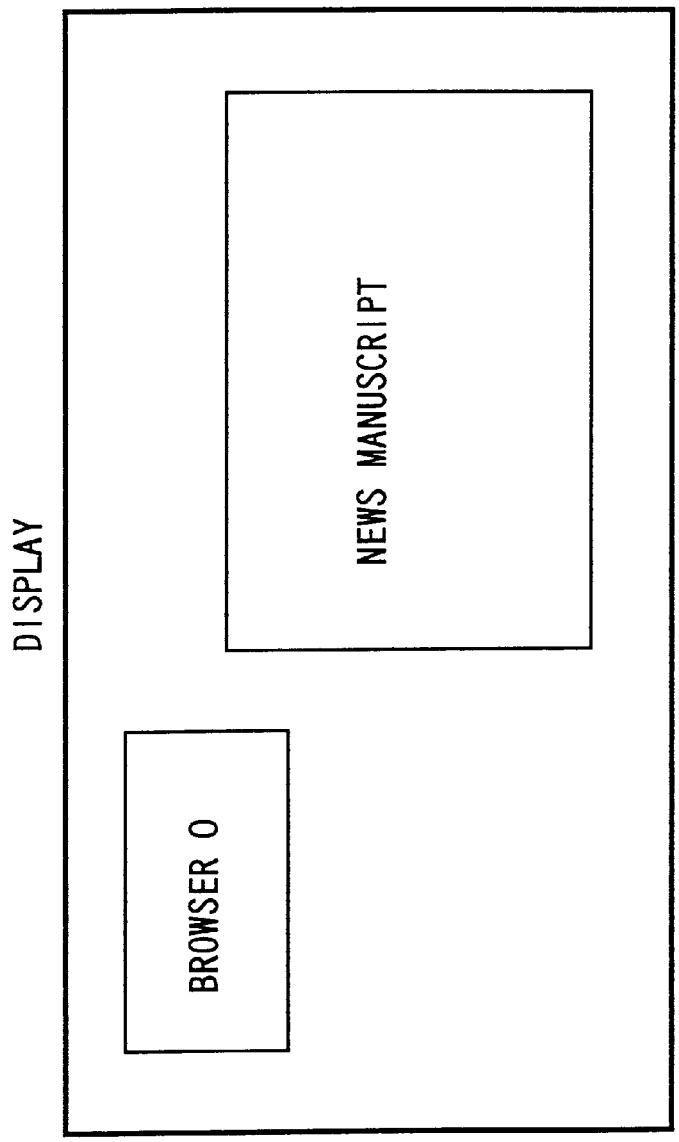
FIG. 8 is a diagram showing an example of how the browser is used for the preparation of a news manuscript.

FIG. 8 is a diagram showing an example of how the browser is used for the preparation of a news manuscript. FIG. 8 shows a display screen of PC. One frame of a shot retrieved from the video material stored (recorded) in the video server, for example, is displayed as browser 0 on the screen. A frame representative of the shot is selected as the frame displayed as the browser. While viewing the browser, a news writer grasps the content of the video material to be put on the air (broadcast), and prepares a news manuscript by using word processor software on the PC. In this way, a news manuscript appropriate to the video material can be prepared.

Figure 9:
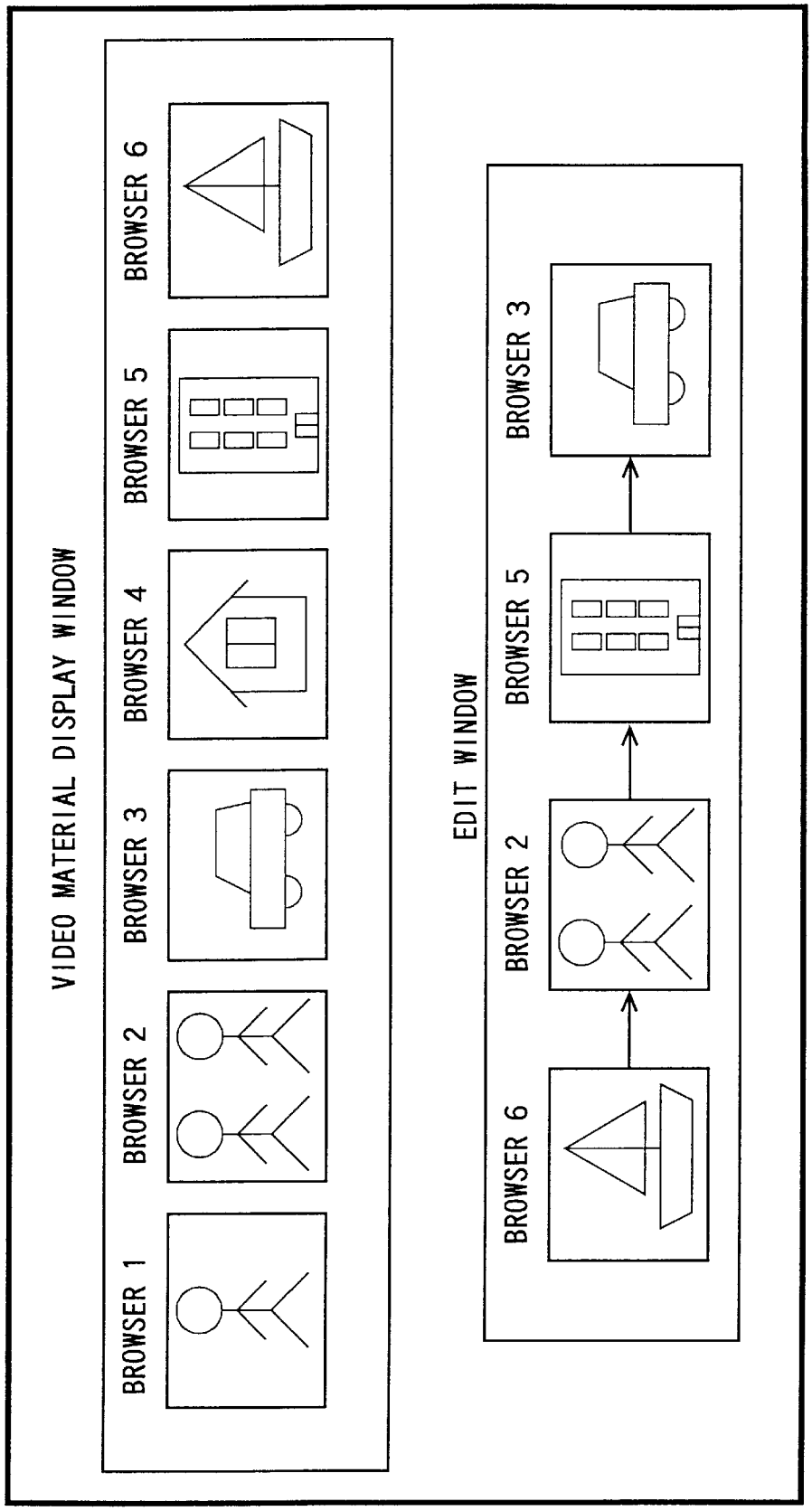
FIG. 9 is a diagram showing an example of how the browser is used in edit work.

FIG. 9 is a diagram showing an example of how the browser is used in edit work. In edit work using a nonlinear editing machine, browsers of shots to be edited are first displayed in a video material display window. In FIG. 9, browser 1, browser 2, browser 3, browser 4, browser 5, and browser 6, representing six shots, are displayed. In FIG. 9, the editor decides to adopt the shots displayed in the browser 6, browser 2, browser 5, and browser 3 in this order, and arranges these browsers in an edit window from left to right in the order decided. Nonlinear edit software creates EDL information based on the time code and, if necessary, on the ID numbers, of the shots shown in the browsers thus arranged in the edit window.

In the above description, the personal computer (PC) is used as an apparatus that serves as both image display means and additional information creating means. This PC corresponds to the PC 105 in FIG. 5.

Data flow when preparing a news manuscript will be described with reference to FIG. 5. In FIG. 5, the operation up to the transmission of image data (coarse image information) to the PC 105 is the same as that in the tentative edit work previously described. After the image data has been transferred and displayed in the browser, the editor plans a news manuscript while viewing the browser, and prepares a news manuscript on the PC 105 by using, for example, a word processor function. The finished news manuscript is, for example, output to a printer or like apparatus, or transferred to some other apparatus via the data transmission line 106, or transferred to the video server 104, as shown by the signal flow 115. The news manuscript is then output together with the image data, as shown by the signal flow 116.

The present invention is applicable for any kind of work that the editor does while viewing a browser displayed on an image display apparatus (PC) in a manner as described above. In this case, the amount of data transferred through the data transmission line 106 is greatly reduced as compared with conventional systems. Furthermore, since the amount of data fed into the PC 105 is reduced, the image editing apparatus can be implemented at lower cost. Moreover, the reduced amount of data in the apparatus (PC) used to prepare a news manuscript means a reduced time required to display the browser and makes effective preparation of news manuscripts possible.

As described above, since the browser is displayed using DC components only, manuscript preparation and image editing for a new program can be accomplished by just transmitting the DC components, video material ID number, and time code.

The ratio in data amount between the DC and AC components varies substantially, depending on the image. If the ratio of the DC components to the AC components is 1:9, for example, since the video material ID number and time code data are negligible compared with image data, the amount of data transferred on the signal flow 113 can be reduced by a factor of almost 10.

For example, consider the case where the data amount of each of the first video material 101, second video material 102, and third video material 103 is 30 megabits per second and the data transmission capacity of the data transmission line 106 is 100 megabits per second.

Suppose here that the first video material 101, the second video material 102, and the third video material 103 are respectively transferring data as shown by the signal flows 110, 111, and 112. In that case, 90 megabits per second is used out of the 100-megabit-per-second data transmission capacity of the data transmission line 106, leaving only 10 megabits per second as available capacity. To do edit work on the PC 105, data transfer shown by the signal flow 113 is needed.

In this situation, if the preserLt invention were not applied, the remaining transmission capacity of 10 megabits per second would not be enough for image data transfer since the signal flow 113 needs a transfer rate of 30 megabits per second. Accordingly, the edit work would have to wait until the completion of the video material transfers.

By contrast, if the present invention is applied, the signal flow 113 needs a transfer rate of only 3 megabits per second, which is a ten-fold decrease compared with 30 megabits per second. Accordingly, the edit work can be performed concurrently with the video material transfers.

In this embodiment shown in FIG. 5, three video material sources, one PC, and one video server are shown, but in an editing system at a television broadcast station or the like, the system is constructed by using many video material sources, many PCs, and many video servers, and on top of that, many workstations, VTRs, disk apparatus, television monitors, editing machines, etc. are connected.

Since there is a possibility that all of these apparatus may transfer data using the data transmission line, very large volumes of data are transferred through the system as a whole. The data transmission amount reduction method in the present invention is particularly effective in such situations.

Furthermore, since the amount of data transferred into the editing apparatus such as a PC is greatly reduced, the editing apparatus can be implemented using a PC with a much smaller main memory or hard disk capacity needed for storing image data.

Moreover, when displaying the results of editing done on the editing apparatus such as a PC, as moving images on the display of the PC, that is, when previewing the edited results as moving images, since the amount of captured data is small, the display speed of the edited results is fast and the editing efficiency is greatly improved. Furthermore, burdens on the CPU, main memory, and hard disk of the PC are also alleviated.

Next, the configuration and operation of the video server 104 will be described with reference to drawings.

Figure 10:
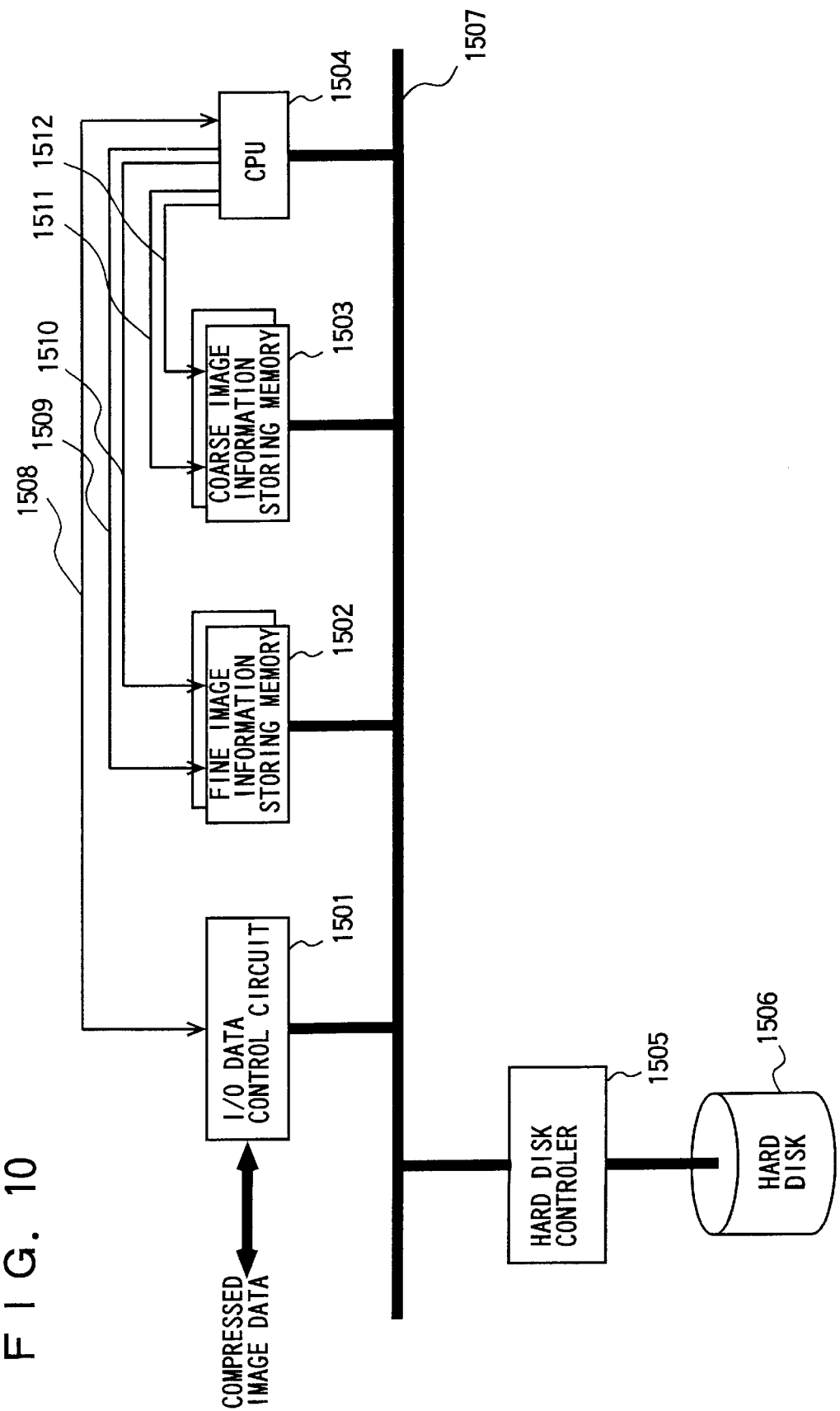
FIG. 10 is a diagram showing the configuration of a video server.

FIG. 10 is a diagram showing the configuration of the video server 104. In FIG. 10, an I/O data control circuit 1501 performs processing for placing compressed image data, input from the outside, onto a data transmission line 1507 for transferring data within the video server 104, and also performs processing for outputting data transferred on the data transmission line 1507 to the outside.

A fine image information storing memory 1502 stores compressed image data (high-frequency data) except coarse image information. A coarse image information storing memory 1503 stores coarse image information representing a rough content of compressed image data.

The fine image information storing memory 1502 and the coarse image information storing memory 1503 each have a write enable terminal which is disabled (write disabled) when set to a high level (hereinafter abbreviated H) and enabled (write enabled) when set to a low level (hereinafter abbreviated L). Further, the fine image information storing memory 1502 and the coarse image information storing memory 1503 each have a read enable terminal which is disabled (read disabled) when set to H and enabled (read enabled) when set to L.

A CPU 1504 controls all circuitry within the video server 104. A hard disk controller 1505 controls data write and read operations on a hard disk 1506. The hard disk 1506 stores (records) data. The data transmission line 1507 is used for transmission of compressed image data and various kinds of control information. In the present embodiment, the data transmission line 1507 can be implemented by any type of transmission line as long as it can carry digital data. In this embodiment, a PCI (Peripheral Component Interconnect) bus is used.

Arrow 1508 indicates a communication line for transferring various kinds of control information between the I/O data control circuit 1501 and the CPU 1504. Arrow 1509 shows a write enable signal that the CPU 1504 issues to the fine image information storing memory 1502 to enable a data write to the fine image information storing memory 1502.

Arrow 1510 shows a read enable signal that the CPU 1504 issues to the fine image information storing memory 1502 to enable a data read from the fine image information storing memory 1502. Arrow 1511 shows a write enable signal that the CPU 1504 issues to the coarse image information storing memory 1503 to enable a data write to the coarse image information storing memory 1503. Arrow 1512 shows a read enable signal that the CPU 1504 issues to the coarse image information storing memory 1503 to enable a data read from the coarse image information storing memory 1503.

The configuration of the video server 104 of the present embodiment has been described.

Next, the operation of the video server 104 will be described with reference to other drawings.

Figure 11:
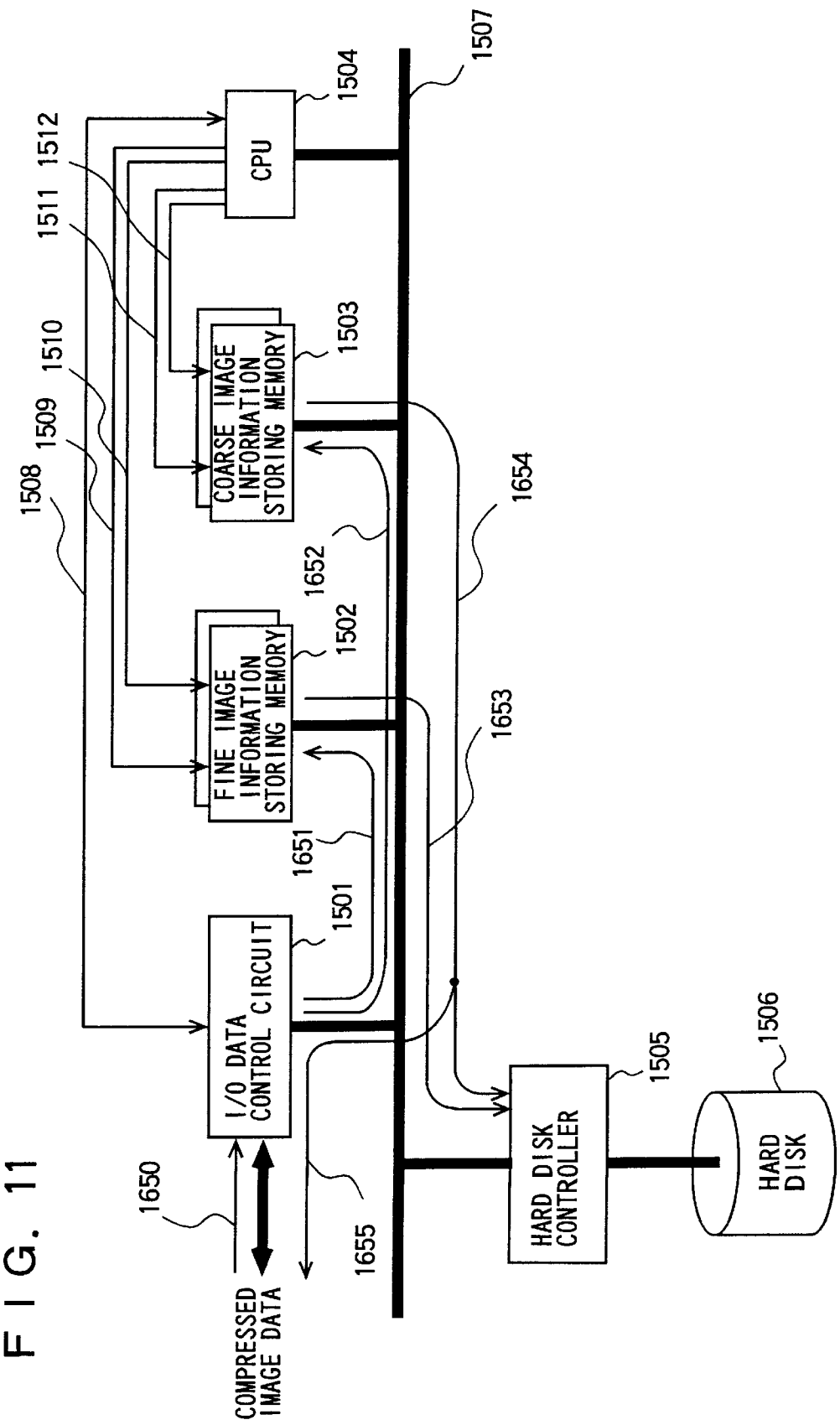
FIG. 11 is a diagram showing the configuration of the video server, along with signal flow when writing data to the video server.

FIG. 11 is a diagram showing the configuration of the video server 104, along with signal flow when writing data to the video server 104. FIG. 11 shows the same video server 104 illustrated in FIG. 10. To facilitate explanation, arrows 1650, 1651, 1652, 1653, 1654, and 1655 are shown each indicating signal flow.

Arrow 1650 shows signal flow from a device external to the video server 104 to the I/O data control circuit 1501. Arrow 1651 shows signal flow from the I/O data control circuit 1501 to the fine image information storing memory 1502. Arrow 1652 shows signal flow from the I/O data control circuit 1501 to the coarse image information storing memory 1503. Arrow 1653 shows signal flow from the fine image information storing memory 1502 to the hard disk controller 1505. Arrow 1654 shows signal flow from the coarse image information storing memory 1503 to the hard disk controller 1505.

Arrow 1655 shows the signal flow of the coarse image information output from the coarse image information storing memory 1503 and transferred via the data transmission line 1507 to the I/O data control circuit 1501 for output to the outside of the video server 104. The data contents are the same as the signal indicated by arrow 1654.

Figure 12:
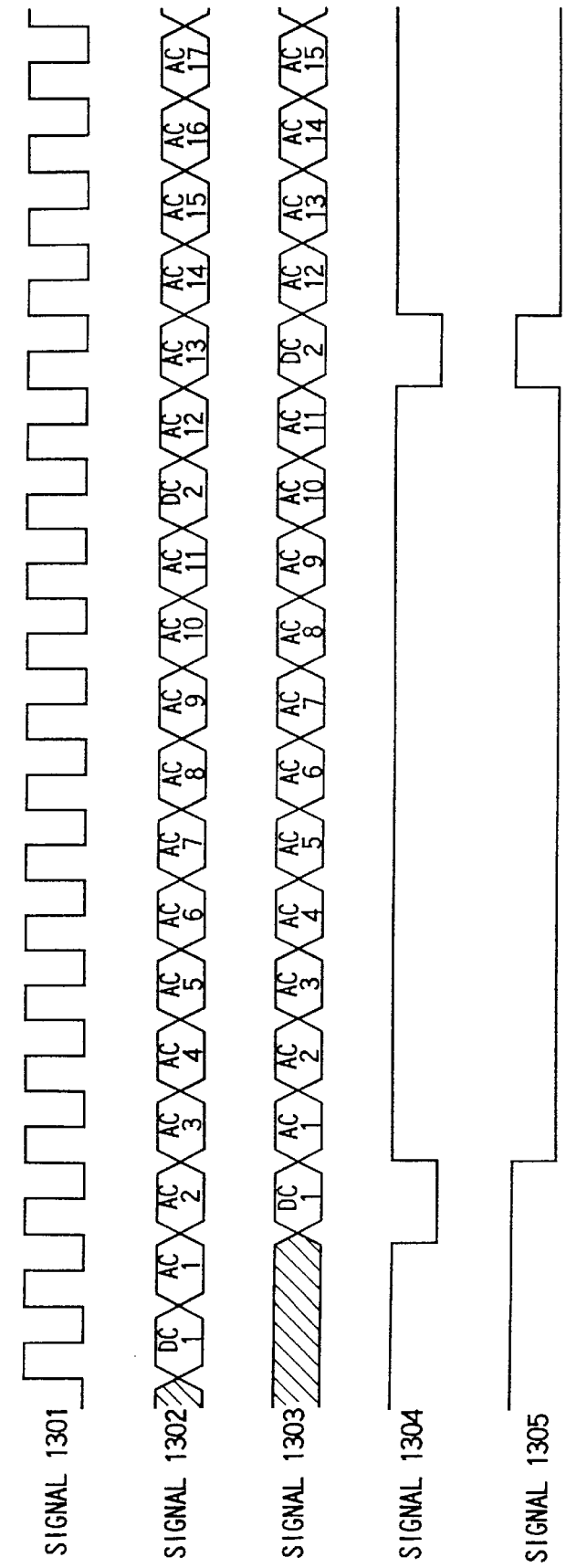
FIG. 12 is a timing chart for a data write to a memory within the video server.
Figure 13:
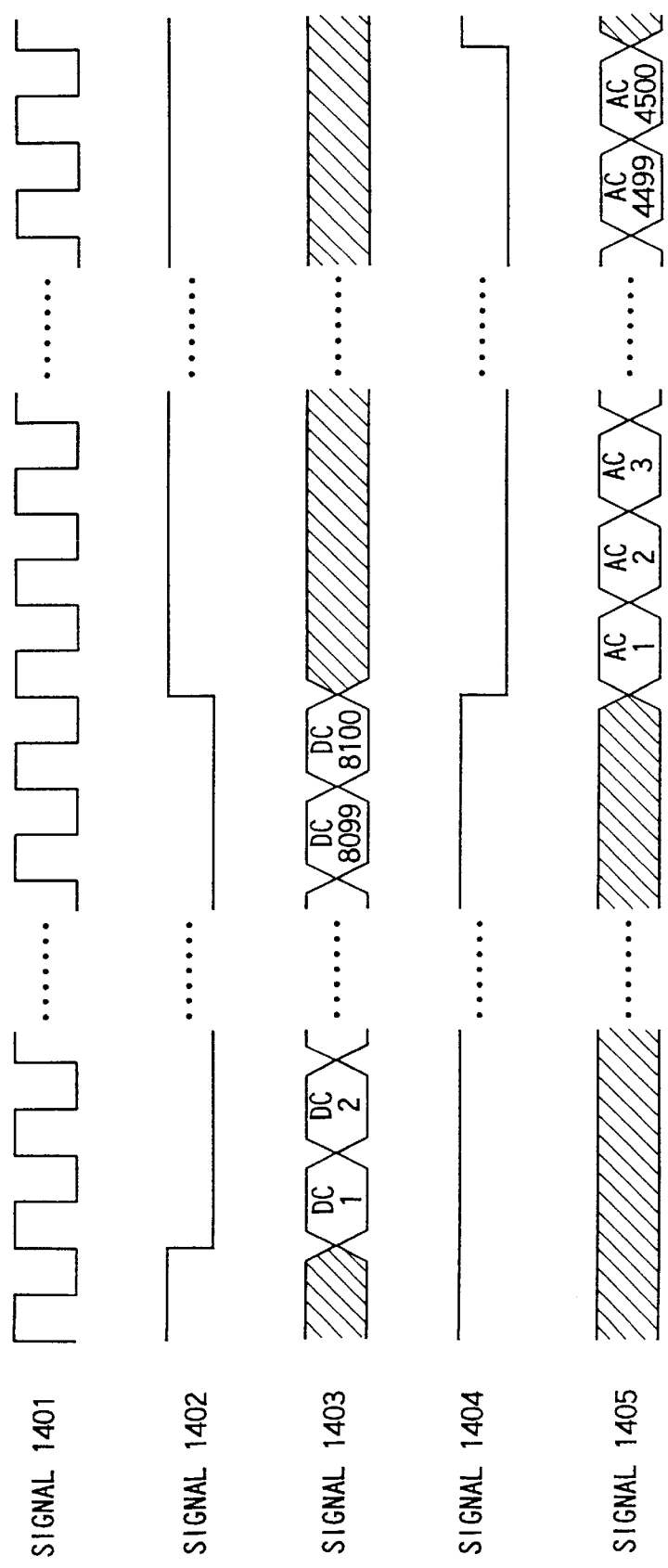
FIG. 13 is a timing chart for a data write to a hard disk attached to the video server.

FIG. 12 is a timing chart for a data write to the fine image information storing memory 1502 and coarse image information storing memory 1503. FIG. 13 is a timing chart for a data write from the fine image information storing memory 1502 and coarse image information storing memory 1503 to the hard disk 1506. In FIGS. 12 and 13, oblique hatching indicates invalid data.

Data write operations to the video server 104 will be described in detail below with reference to FIGS. 11, 12, and 13.

In FIG. 12, signal 1301 is a system clock of the video server 104. Signal 1302 is an input compressed image signal, which is the signal indicated by arrow 1650 (FIG. 11). The DC and AC components of this signal are input to the I/O data control circuit 1501. The I/O data control circuit 1501 sends a data arrival signal 1508 to the CPU 1504. After a delay of two clock pulses allowed for signal processing within the I/O data control circuit 1501, the compressed image signal is output from the I/O data control circuit 1501 onto the data transmission line 1507. The timing of this operation is shown by signal 1303. In synchronism with an output of the DC component, the write enable signal 1511 to the coarse image information storing memory 1503 is set to L by the CPU 1504. The operation timing of the write enable signal 1511 is shown by signal 1304.

The write enable signal 1509 to the fine image information storing memory 1502 is set to L by the CPU 1504 in synchronism with an output of the AC component. The operation timing of the write enable signal 1509 is shown by signal 1305.

As described above, when coarse image data is put on the data transmission line 1507, the write enable to the coarse image information storing memory 1503 is at L, and when fine image data is put on the data transmission line 1507, the write enable to the fine image information storing memory 1502 is at L. With these operations, only the coarse image information (DC components) is written to the coarse image information storing memory 1503, and only the fine image information (AC components) is written to the fine image information storing memory 1502.

Read operations from the respective memories and write operations to the hard disk 1506 will be described next.

First, the CPU 1504 drives the read enable signal 1512 to L to the coarse image information storing memory 1503. The operation timing of the read enable signal 1512 at this time is shown by signal 1402 in FIG. 13, and the operation timing of the data output on the data transmission line 1507 is shown by signal 1403. Signal 1401 is the system clock of the video server 104, which is the same as that shown by signal 1301. The DC components are read out sequentially until all data stored in the coarse image information storing memory 1503 are output. The readout DC components are output on the data transmission line 1507 and transferred to the hard disk controller 1505. The data flow at this time is shown by arrow 1654 (FIG. 11). During this period, the read enable signal 1512 is held at L as shown by signal 1402 in FIG. 13.

When all the DC components are output from the coarse image information storing memory 1503, the read enable signal 1512 is set to H as shown by signal 1402, and at the same time, the read enable signal 1510 to the fine image information storing memory 1502 is set to L as shown by signal 1404. At the next clock pulse after the read enable signal 1510 is set to L, the AC components stored in the fine image information storing memory 1502 begin to be output. And all the AC components stored in the fine image information storing memory 1502 are transferred to the hard disk controller 1505 via the data transmission line 1507. The data flow at this time is shown by arrow 1653.

FIG. 14 is a conceptual diagram illustrating the transfer of the coarse image information and fine image information to the hard disk 1506. That is, the diagram illustrates the signal flows 1654 and 1653 (shown in FIG. 11) through the data transmission line 1507.

Referring to FIG. 14, we will describe how the coarse image information and fine image information are transferred to the hard disk 1506. FIG. 14 shows the transfer of image data for one frame.

First, the DC components of the Y signal, shown in luminance signal coarse image information part 1201, are transferred. Next, the DC components of the Cb signal, shown in color-difference signal coarse image information part 1202, are transferred. Next, the DC components of the Cr signal, shown in color-difference signal coarse image information part 1203, are transferred. Next, the AC components of the Y signal, shown in luminance signal fine image information part 1204, are transferred. Next, the AC components of the Cb signal, shown in color-difference signal fine image information part 1205, are transferred. Next, the AC components of the Cr signal, shown in color-difference signal fine image information part 1206, are transferred.

In this embodiment of the present invention, there are as many DC components of the Y signal as there are the DCT blocks of the Y signal, that is, a total of 5400 DC components per frame. The number of DC components of the Cb signal and the number of DC components of the Cr signal are the same as the number of DCT blocks of the Cb signal and the number of DCT blocks of the Cr signal, respectively. That is, there are 1350 DC blocks per frame for each color-difference signal.

The number of AC components of each of the Y, Cb, and Cr signals varies between frames, since the number of AC components quantized to zero in each block varies depending on the image. In the example of FIG. 14 illustrating the present embodiment, the Y signal has 200,000 AC components, the Cb signal has 40,000 AC components, and the Cr signal has 50,000 AC components.

When there is work, such as edit work, that needs to be done in a hurry, the DC components are output to outside of the video server 104 from the I/O data control circuit 1501, at the same time that the image information is transferred to the hard disk 1506.

At this time, the I/O data control circuit 1501 need only output the image information to the outside only when the DC components are being transferred through the data transmission line 1507. That is, the I/O data control circuit 1501 is enabled for output only when the luminance signal coarse image information part 1201, color-difference signal coarse image information part 1202, and color-difference signal coarse image information part 1203 are being transferred through the data transmission line 1507, as shown by arrow 1654. The I/O data control circuit 1501 should be disabled for output when the luminance signal fine image information part 1204, color-difference signal fine image information part 1205, and color-difference signal fine image information part 1206 are being transferred through the data transmission line 1507, as shown by arrow 1653.

The timing for enabling and disabling the I/O data control circuit 1501 for output is controlled by the signal 1508 from the CPU 1504. In the present invention, since the coarse image information and the fine image information are respectively transferred in a plurality of contiguous segments, switching of control from the CPU 1504 seldom occurs. This greatly facilitates control and dramatically reduces the burden of the CPU 1504.

This also makes it possible to reduce greatly the power consumption of the I/O data control circuit 1501 as well as the CPU 1504.

The DC components read from the coarse image information storing memory 1503 and the AC components read from the fine image information storing memory 1502 are transferred to the hard disk controller 105, and written to the hard disk 1506 in the order in which there were transferred.

Figure 15:
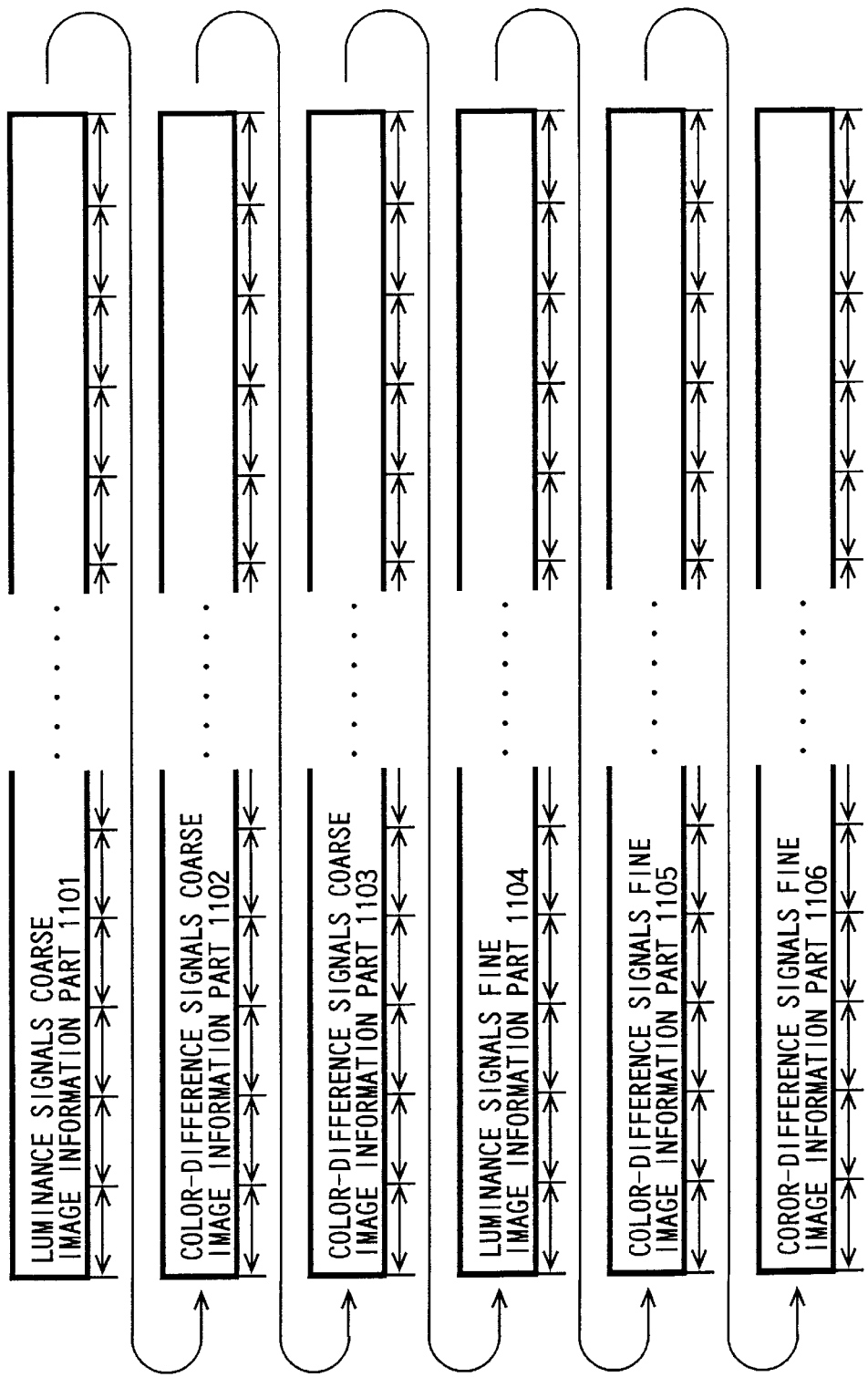
FIG. 15 is a conceptual diagram illustrating the writing of image information to the hard disk.

FIG. 15 is a conceptual diagram illustrating the writing of image information to the hard disk 1506. As shown in FIG. 15, the image information is written in the order of: the coarse information of the luminance signal (the DC components of the Y signal) shown as luminance signal coarse information part 1101, the coarse information of the color-difference signal Cb (the DC components of the Cb signal) shown as color-difference signal coarse information part 1102, the coarse information of the color-difference signal Cr (the DC components of the Cr signal) shown as color-difference signal coarse information part 1103, the fine information of the luminance signal (the AC components of the Y signal) shown as luminance signal fine information part 1104, the fine information of the color-difference signal Cb (the AC components of the Cb signal) shown as color-difference signal fine information part 1105, and the fine information of the color-difference signal Cr (the AC components of the Cr signal) shown as color-difference signal fine information part 1106.

Usually, data is divided into a plurality of blocks when written to a disk. In FIG. 15, the concept of recording data in blocks is illustrated using double-headed arrows each defining one block unit.

Figure 16:
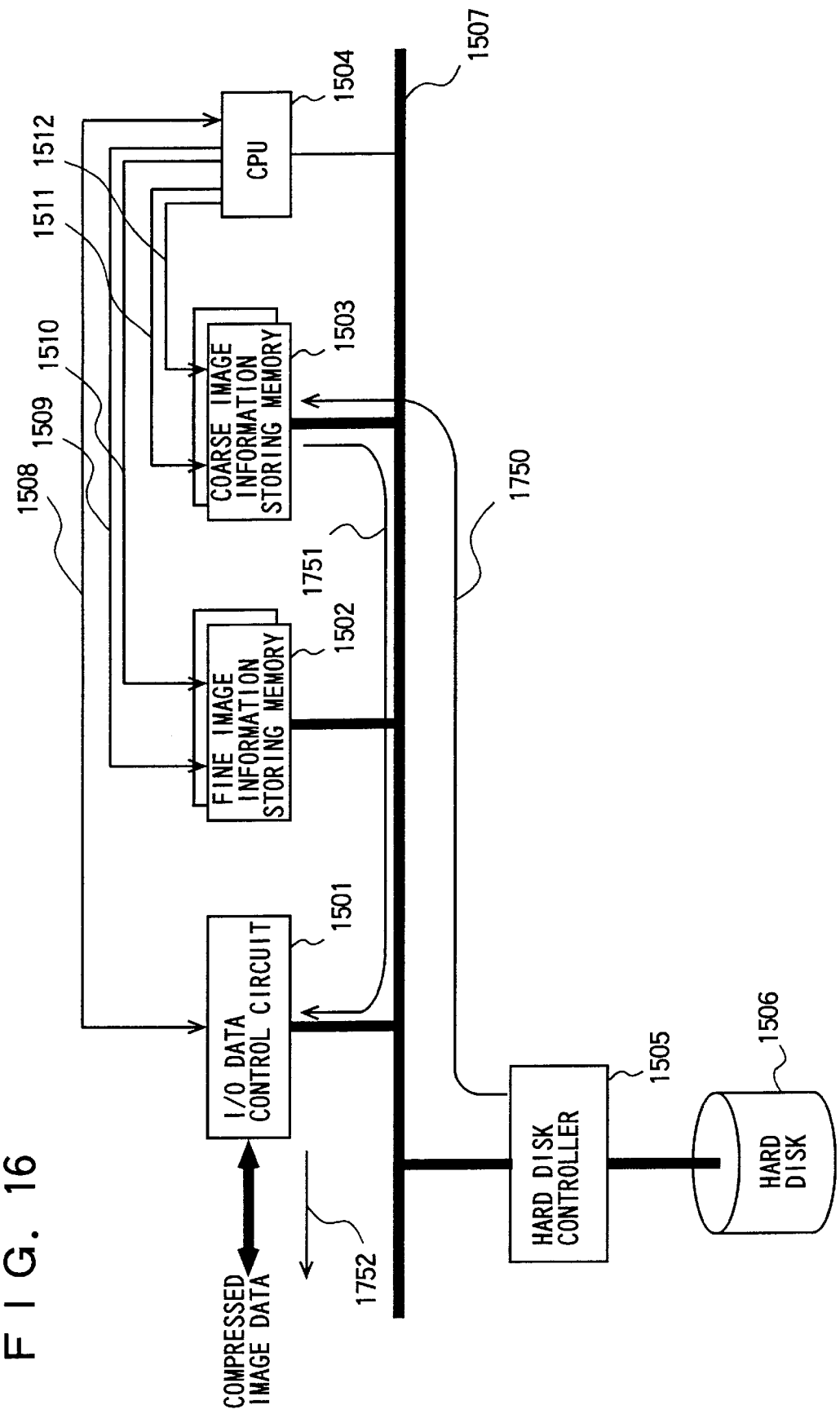
FIG. 16 is a diagram showing the configuration of the video server, along with signal flow when reading DC component data from the video server.
Figure 17:
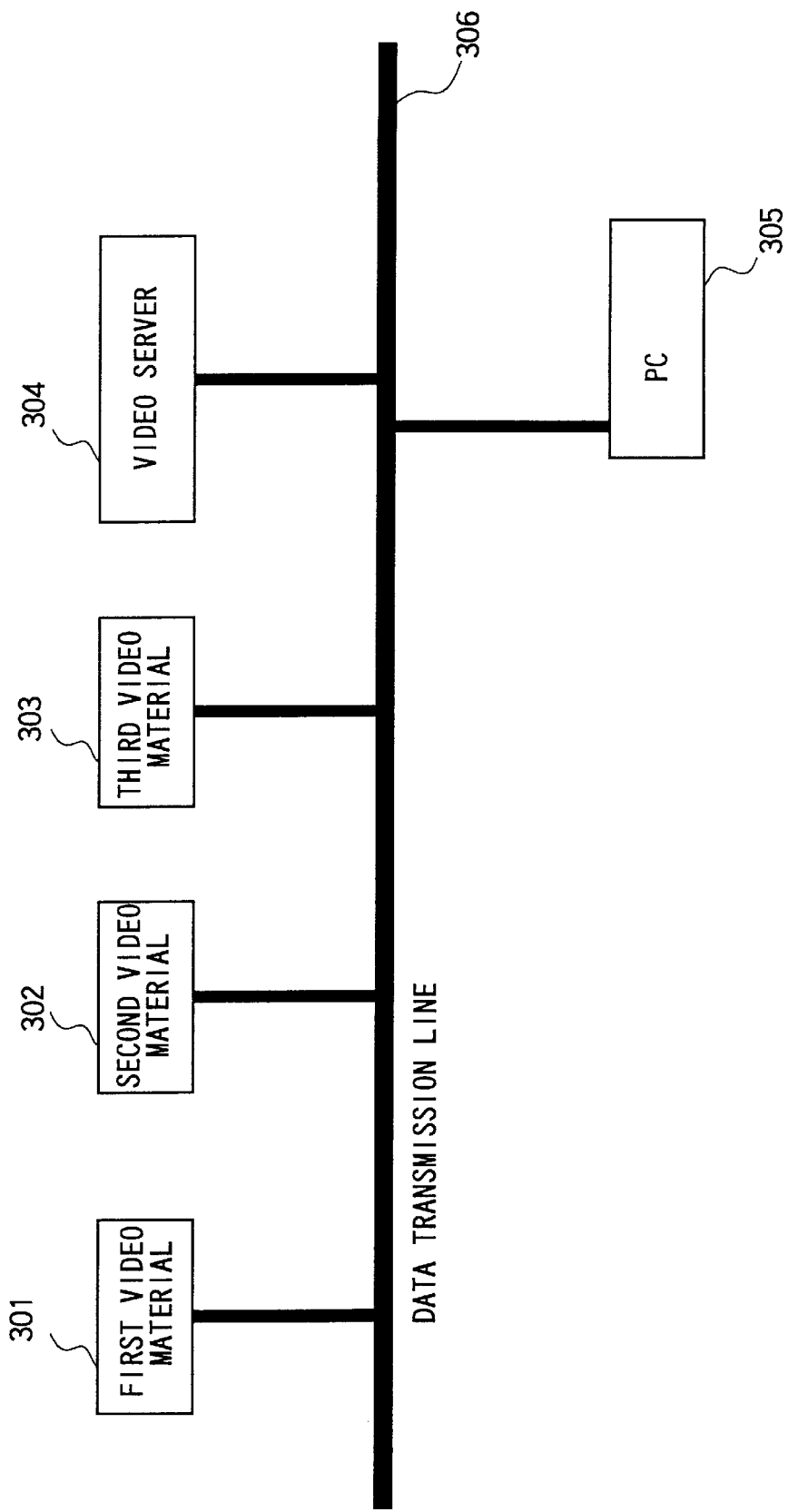
FIG. 17 is the diagram showing the configuration of the prior art image editing apparatus using the video server.

FIG. 16 is a diagram showing the configuration of the video server, along with signal flow when reading DC component data from the video server.

Referring to FIG. 16, we will new describe how DC component data recorded on the hard disk 1506 is output from the video server.

FIG. 16 shows the same video server illustrated in FIG. 10. To facilitate explanation, arrows 1750, 1751, and 1752 are shown each indicating signal flow.

Arrow 1750 indicates the signal flow from the hard disk controller 1505 to the coarse image information storing memory 1503. Arrow 1751 indicates the signal flow from the coarse image information storing memory 1503 to the I/O data control circuit 1501. Arrow 1752 indicates the signal flow from the I/O data control circuit 1501 to the outside of the video server 104.

First, the CPU 1504 sends a data readout instruction to the hard disk controller 105 via the data transmission line 1507. This instruction is for retrieving only coarse image information from the hard disk 1506, rather than all data.

The hard disk controller 1505 controls the hard disk 1506 and retrieves only coarse image information (DC components). That is, the luminance signal coarse image information part 1101, color-difference coarse image information part 1102, and color-difference coarse image information part 1103 shown in FIG. 15 are retrieved. The signal flow at this time is shown by arrow 1750.

The coarse image information read out of the hard disk 1506 is transferred via the data transmission line 1507 and stored in the coarse image information storing memory 1503. At this time, the CPU 1504 sets the write enable signal 1511 to L when the coarse image information is placed on the data transmission line 1507, thus allowing the coarse image information to be written into the coarse image information storing memory 1503.

Next, the coarse image information stored in the coarse image information memory 1503 is transferred to the I/O data control circuit 1501 via the data transmission line 1507. At this time, the CPU 1504 sets the read enable signal 1512 to L when the coarse image information is output on the data transmission line 1507, thus allowing the coarse image information to be output from the coarse image information storing memory 1503.

The I/O data control circuit 1501 converts the coarse image information into a form that can be output to the outside. At this time, the CPU 1504 controls the I/O data control circuit 1501 through the signal 1508 to control the timing for outputting the data transferred from the coarse image information storing memory 1503.

In the above-mentioned operation for reading out DC component data from the video server, the hard disk 1506 and the hard disk controller 1505 for controlling it can accomplish the respective tasks by reading out only sections where the DC components are recorded contiguously.

That is, the readout operation can be accomplished by reading out (accessing) only blocks where the luminance signal coarse image information part 1101, color-difference signal coarse image information part 1102, and color-difference signal coarse image information part 1103 shown in FIG. 15 are written.

Since the ratio of the luminance signal coarse image information part 1101, color-difference signal coarse image information part 1102, and color-difference signal coarse image information part 1103 to the entire image information shown in FIG. 15 is very small, the coarse image information can be read out very fast from the hard disk 1506, and the service life of the hard disk 1506 can be extended accordingly.

Furthermore, since the operation time of the hard disk 1506 and hard disk controller 1505 becomes short, power consumption can be reduced drastically.

These effects are made possible by recording the plurality of segments of the coarse image information in contiguous fashion on the hard disk, that is, with the write blocks of the coarse image information arranged contiguously on the hard disk.

Moreover, the fine image information storing memory 1502 need not be operated at all, and further, there is no need to control the signals 1509 and 1510. This has the effect of drastically reducing the power consumption of the fine image information storing memory 1502 and CPU 1504, while greatly alleviating the burden of the CPU 1504.

In FIG. 10, the coarse image information storing memory 1503 and the fine image information storing memory 1502 are each constructed from two memory sections, one being written to while the other is being read out, so that data can be written and read out without interruption by switching the two memory sections between read and write modes.

The coarse image information storing memory 1503 and the fine image information storing memory 1502 need not necessarily be provided separately. For example, by storing coarse image information at low memory addresses and fine image information at high memory addresses, the present invention can be implemented using one image information storing memory.

The above-mentioned embodiment has been described by taking the video server as an example of the storage apparatus (recording apparatus) for storing video material, but other apparatus, such as a digital VTR, semiconductor memory, hard disk, video disk, etc., can be used as long as the apparatus is capable of storing image data. In that case also, the present invention can be carried out in the same way.

In the above-mentioned embodiment, news manuscript has been taken as an example of additional information relating to image information, but the additional information is not limited to news manuscript. Rather, any other kind of information, such as EDL information used for edit work or captions inserted into the screen (image), may be used as long as the information relates to the image concerned. In that case also, the present invention is effective.

Furthermore, in the above-mentioned embodiment, the DCT transform has been used for image data compression. Recall here that the point of the present invention is that, when the components of the compressed image data have importance of differing degrees, image data is extracted from important components only necessary to identify the image content, and the extracted image data is transferred for display (browsing). The compression method, therefore, need not be limited to the DCT transform; rather, image compression schemes using other orthogonal transforms, such as the K-L transform, DST transform, Hadamard transform, Haar transform, Fourier transform, and slant transform, may be used as long as the transformed results of image data components represent differing degrees of importance so that the image data can be compressed using the difference in importance. Using any of such compression schemes, the present invention can be implemented.

In the above-mentioned embodiment, an example has been described in which only DC components resulting from the DCT transform are transferred to the image display apparatus (PC) for display, but not only the DC components but some of the AC components may also be transferred to the image display apparatus (PC) to improve the quality of the displayed image by some degree. In that case also, the present invention can be implemented without defeating the purpose thereof, since the amount of data stored and transferred to the image display apparatus (PC) is reduced compared with the prior art method in which the entire compressed image data is stored and transferred to the image display apparatus (PC).

In the above-mentioned embodiment, EDL information or news manuscript was transferred from the PC to the video server, and the video server, which received the EDL information or news manuscript, reordered the image data based on the EDL information and sent out the edited image or the received news manuscript. Alternatively, editing may be performed by transferring the EDL information from the PC to another editing apparatus such as a VTR by using a data transmission line or a floppy disk.

In the above-mentioned embodiment, only one data transmission line has been shown; however, if two or more data transmission lines are provided, or if part of the data transmission lines is used as a dedicated line for data transfer, the present invention can also be implemented without defeating its purpose of reducing the data transmission amount.

In the above-mentioned embodiment, time code information was transferred to the PC, but rather than transferring time code information to the PC, only a display may be produced at the PC and only edit point information may be transferred from the PC to the video server so that the edit information can be created at the video server. This can be easily accomplished by transferring only coarse image information containing at least DC components along the signal flow 113 and by issuing a PC command designating an edit point along the signal flow 115.

In the above-mentioned embodiment, the first video material 110, the second video material 102, and the third video material 103 have been described as compressed image data, but the video material need not necessarily be compressed data; it is only necessary that the data be in compressed form before being transferred into the PC.

In the above-mentioned embodiment, no description has been given of image compression along time axis, but when image compression along time axis is done, if it is done in accordance with the purpose of the present invention, it is also within the scope of the present invention.

In the above-mentioned embodiment, when requesting transfer of image data from the video server 104 to the PC, an image data request command was issued through the signal flow 114, but if the image information is stored in advance in the PC's HDD or main memory, the request command for that image data need not be issued using the signal flow 114.

In the above-mentioned embodiment, of the DC and AC components subjected to image compression through the DCT transform, only the DC components were used to generate the coarse image information; the video server was used as the image storing means for storing image information; the personal computer was used as the edit information creating means; the EDL was used to provide the processing edit information used to perform real processing editing; and time code and cassette number identifying the video cassette holding the image data are used as the index information. It should, however, be noted that the present invention is not limited to the above-mentioned embodiment, but rather, various modifications are possible in accordance with the purpose of the present invention, and such modifications are also included in the scope of the present invention.

In the above-mentioned embodiment, a transmission line conforming to Ethernet (IEEE 802.2, IEEE 802.3) was used as the data transmission line 106, but any other type of transmission line that can carry digital data may be used, such as those used in ATM, 100BASE-T, 100VG-AnyLAN, FDDI, TPFDDI, IEEE 1394, etc. Instead of using a network-type transmission line, it is also possible to use a PCI (Peripheral Component Interconnect) bus or other type of bus used as an internal bus of a personal computer.

Further, in the above-mentioned embodiment, a PCI bus was used as the data transmission line 1507, but any other type of bus that can carry digital data may be used, for example, a SCSI (Small Computer System Interface) bus. Instead of a bus, a network-type transmission line can be used, such as those used in ATM, 100BASE-T, 100VG-AnyLAN, FDDI, TPFDDI, IEEE 1394, etc. It is also possible to use a transmission line such as one used in a wide-area B-ISDN.

In the above-mentioned embodiment, image data that was compressed through the DCT process, quantization and variable-length coding was used as an example of the image data transferred and stored (recorded); however, if the image data is subjected to other types of processing, such as processing for assembling the image data into packets for telecommunication or shuffling for recording on a VTR, or processing for assembling this image data into VTR synchronization blocks, such image processing is also within the scope of the present invention as long as it is done in accordance with the purpose of this present invention.

In the above-mentioned embodiment, the plurality of segments of the coarse image information were arranged before the plurality of segments of the fine image information for transmission and recording. However, since the point of the present invention is to process the coarse image information and the fine image information by grouping the respective segments together, the plurality of segments of the coarse image information may be arranged after the plurality of segments of the fine image information for transmission and recording.

Furthermore, in the above-mentioned embodiment, the coarse image information segments and the fine image information segments were respectively grouped together on a frame-by-frame basis. However, since the point of the present invention is to process the coarse image information and the fine image information by grouping the respective segments together, they may be grouped together on a longer-than-one-frame or shorter-than-one-frame basis, rather than on a frame-by-frame basis.

In the above-mentioned embodiment, the video server as the apparatus for storing (recording) video material and the PC as the apparatus for performing editing work were provided separately, and were connected together by a data transmission line, but the invention is not limited to this configuration. For example, a configuration where the PC is equipped with a hard disk for storing (recording) video material is also possible. This essentially means that the data transmission line used in the present invention is not limited to a computer internal bus, such as a PCI bus, or a network-type transmission line such as Ethernet or other network architecture, and that any type of interface may be used to interconnect the various apparatus without departing from the scope of the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An image editing apparatus comprising:
   first image storing means for dividing an image data frame into a plurality of blocks, each block having a predetermined size, and storing image information about said blocks in a converted image formation by converting the contents of each block into image components comprising a DC component and AC components through DCT transformation;
   coarse image information display means for substantially concurrently extracting and displaying coarse image information from said first image storing means, said coarse image information representing one of said DC component and said DC component and low-frequency AC components among the converted image formation in said first image storing means;
   dividing means for dividing said image information between said coarse image information, which constitutes a part of said image components, and represents a rough content of said image information and fine image information, which constitutes a part of said image components, and represents detail information of said image information, said coarse information and said fine information being separately stored in a second image storing means;
   coarse image information transmitting means for transmitting said coarse image information in a plurality of contiguous segments when transmitting said coarse image information and said fine image information; and
   fine image information transmitting means for transmitting said fine image information in a plurality of contiguous segments when transmitting said coarse image information and said fine image information, wherein provisions are made so that said plurality of segments of said coarse image information output from said coarse image information transmitting means are transmitted preceding or following said plurality of segments of said fine image information output from said fine image information transmitting means.

2. An image editing apparatus comprising:
   first image storing means for dividing an image data frame into a plurality of blocks, each block having a predetermined size, and storing image information about said blocks in a converted image formation by converting the contents of each block into image components comprising a DC component and AC components through DCT transformation;
   coarse image information display means for substantially concurrently extracting and displaying coarse image information from said first image storing means, said coarse image information representing one of said DC component and said DC component and low-frequency AC components among the converted image formation in said first image storing means;
   dividing means for dividing said image information between said coarse image information, which constitutes a part of said image components, and represents a rough content of said image information and fine image information, which constitutes a part of said image components, and represents detail information of said image information, said coarse information and said fine information being separately stored in a second image storing means;
   coarse image information storing means for storing said coarse image information in said second image storing means;
   fine image information storing means for storing said fine image information in said second image storing means; and
   control means for controlling said coarse image information storing means and said fine image information storing means, wherein said control means controls said coarse image information storing means and said fine image information storing means so that a plurality of segments constituting said coarse image information are transmitted preceding or following a plurality of segments constituting said fine image information.

3. An image editing apparatus comprising:

first image storing means for dividing an image data frame into a plurality of blocks, each block having a predetermined size, and storing image information about said blocks in a converted image formation by converting the contents of each block into image components comprising a DC component and AC components through DCT transformation;

coarse image information display means for substantially concurrently extracting and displaying coarse image information from said first image storing means, said coarse image information representing one of said DC component and said DC component and low-frequency AC components among the converted image formation in said first image storing means;

dividing means for dividing said image information between said coarse image information, which constitutes a part of said image components, and represents a rough content of said image information and fine image information, which constitutes a part of said image components, and represents detail information of said image information, said coarse information and said fine information being separately stored in a second image storing means;

coarse image information transmitting means for transmitting said coarse image information in a plurality of contiguous segments;

fine image information transmitting means for transmitting said fine image information in a plurality of contiguous segments; and recording means for recording said coarse image information and said fine image information, said plurality of segments of said coarse image information output from said coarse image information transmitting means being recorded preceding or following said plurality of segments of said fine image information output from said fine image information transmitting means.

4. An image editing apparatus comprising:

first image storing means for dividing an image data frame into a plurality of blocks, each block having a predetermined size, and storing image information about said blocks in a converted image formation by converting the contents of each block into image components comprising a DC component and AC components through DCT transformation;

coarse image information display means for substantially concurrently extracting and displaying coarse image information from said first image storing means, said coarse image information representing one of said DC component and said DC component and low-frequency AC components among the converted image formation in said first image storing means;

dividing means for dividing said image information between said coarse image information, which constitutes a part of said image components, and represents a rough content of said image information and fine image information, which constitutes a part of said image components, and represents detail information of said image information, said coarse information and said fine information being separately stored in a second image storing means;

coarse image information storing means for storing said coarse image information;

fine image information storing means for storing said fine image information;

control means for controlling said coarse image information storing means and said fine image information storing means;

image information recording means for recording said coarse image information and said fine image information; and recording control means for controlling said image information recording means, said control means controlling said coarse image information storing means and said fine image information storing means so that a plurality of segments constituting said coarse image information are transmitted preceding or following a plurality of segments constituting said fine image information, and said recording control means controls said image information recording means so that said plurality of segments constituting said coarse image information are recorded preceding of following said plurality of segments constituting said fine image information.

5. An image editing apparatus comprising:

An image editing apparatus comprising:

image storing means for dividing an image data frame into a plurality of blocks, each block having a predetermined size, and storing image information about said blocks in a converted image formation by converting the contents of each block into image components comprising a DC component and AC components through DCT transformation;

coarse image information display means for substantially concurrently extracting and displaying coarse image information from said image storing means, said coarse image information representing one of said DC component and said DC component and low-frequency AC components among the converted image formation in said image storing means; and additional information producing means for producing additional information relating to said image information by displaying said coarse information.

6. An image editing apparatus comprising:

image storing means for dividing an image data frame into a plurality of blocks, each block having a predetermined size, and storing image information about said blocks in a converted image formation by converting the contents of each block into image components comprising a DC component and AC components through DCT transformation;

coarse image information display means for substantially concurrently extracting and displaying coarse image information from said image storing means, said coarse image information representing one of said DC component and said DC component and low-frequency AC components among the converted image formation in said image storing means; and edit information producing means for performing virtual processing editing by displaying said coarse image information, and for producing processing edit information used to perform real processing editing.

7. An image editing apparatus in accordance with claim 6, wherein said edit information producing means has index information for locating image information, and said processing edit information used to perform real processing editing is created based on said index information.

* * * * *